Feb. 19, 1935.　　　　F. A. BEAN　　　　1,991,652
CONVEYING SYSTEM
Filed Feb. 13, 1933　　21 Sheets-Sheet 1

Fig.1-A

INVENTOR
Francis A. Bean
By Paul, Paul & Moore
ATTORNEYS

Feb. 19, 1935.  F. A. BEAN  1,991,652

CONVEYING SYSTEM

Filed Feb. 13, 1933  21 Sheets-Sheet 2

INVENTOR
Francis A. Bean
By Paul, Paul N Moore
ATTORNEYS

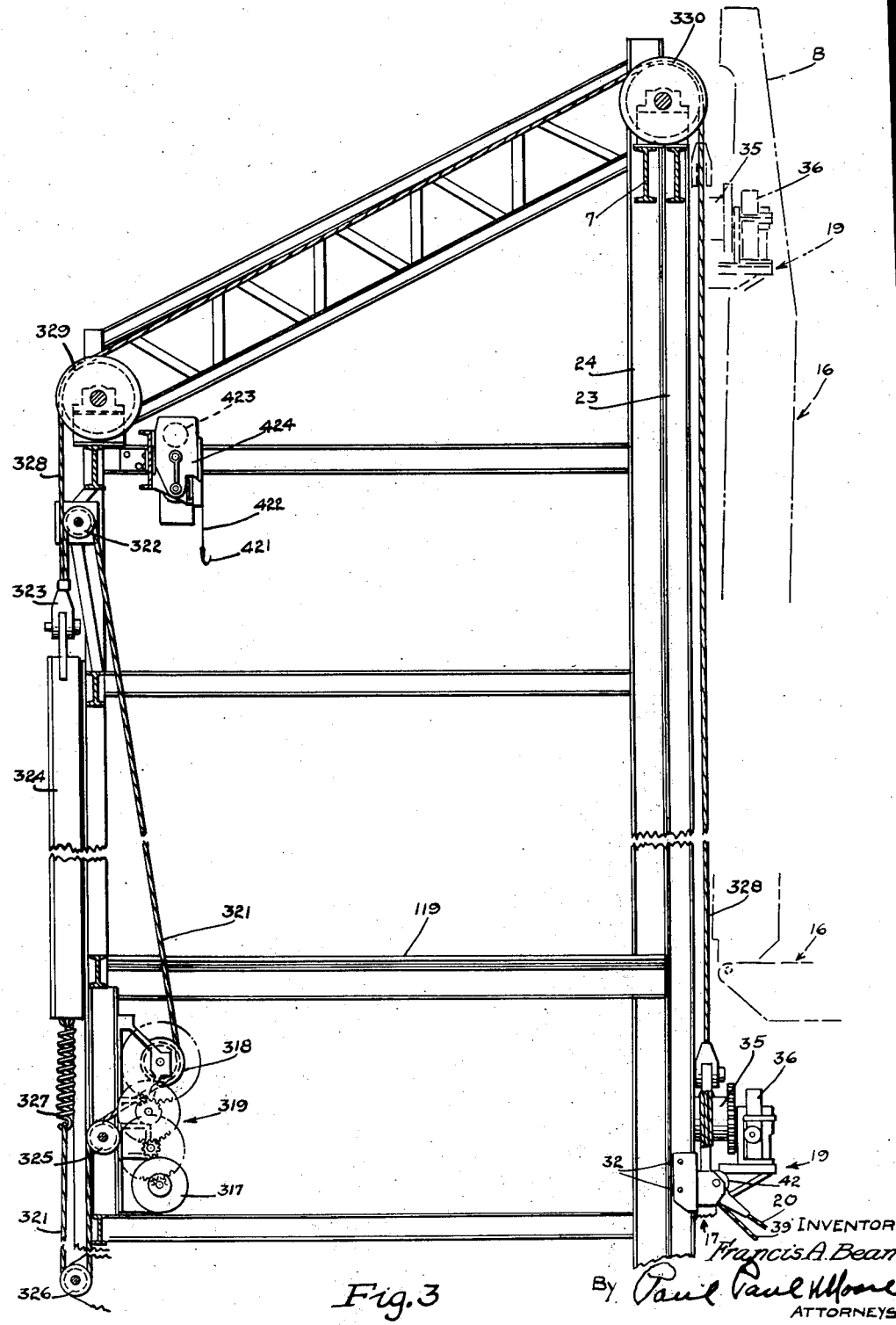

Feb. 19, 1935. F. A. BEAN 1,991,652
CONVEYING SYSTEM
Filed Feb. 13, 1933 21 Sheets-Sheet 4

INVENTOR
Francis A. Bean
By Paul, Paul & Moore
ATTORNEYS

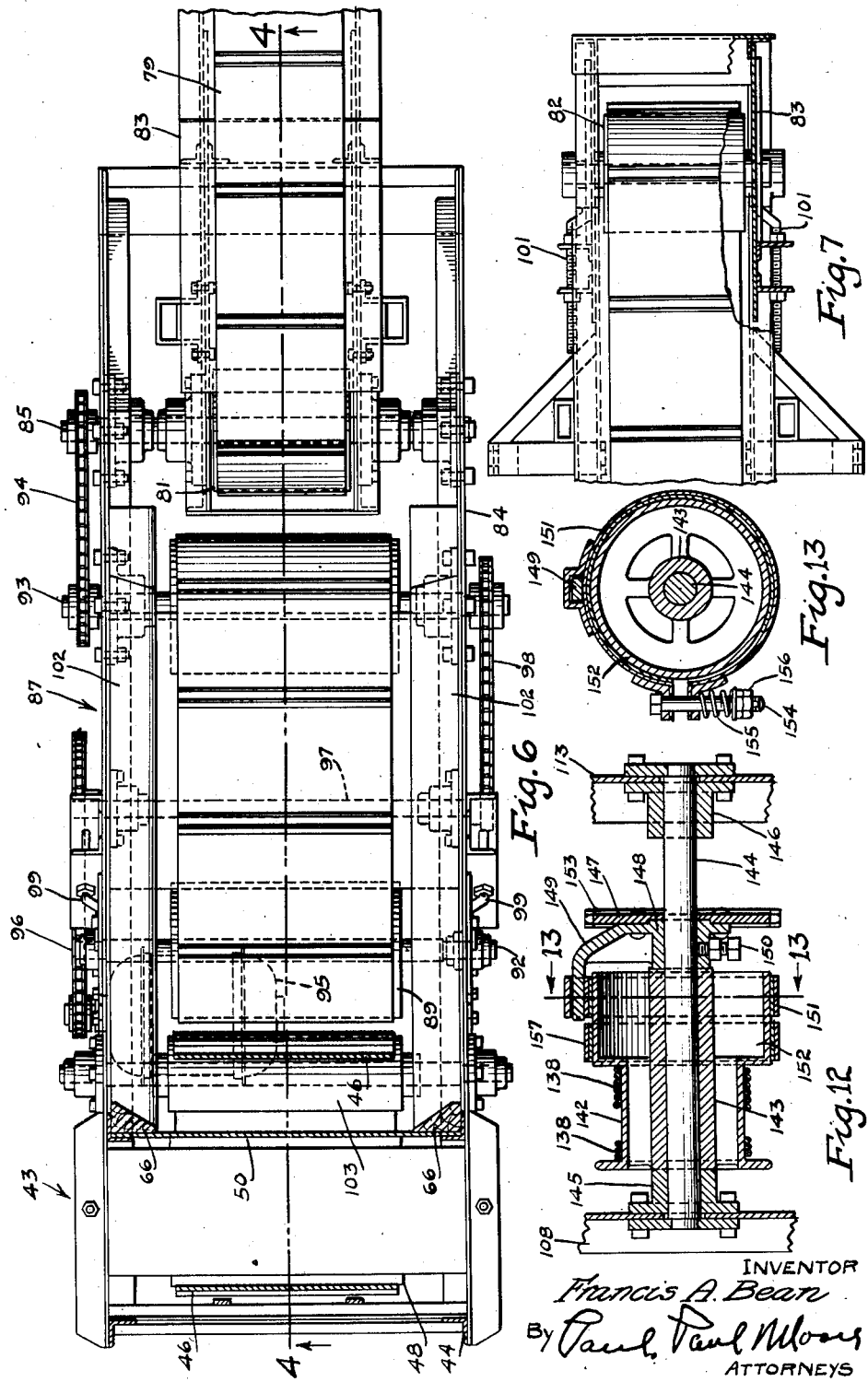

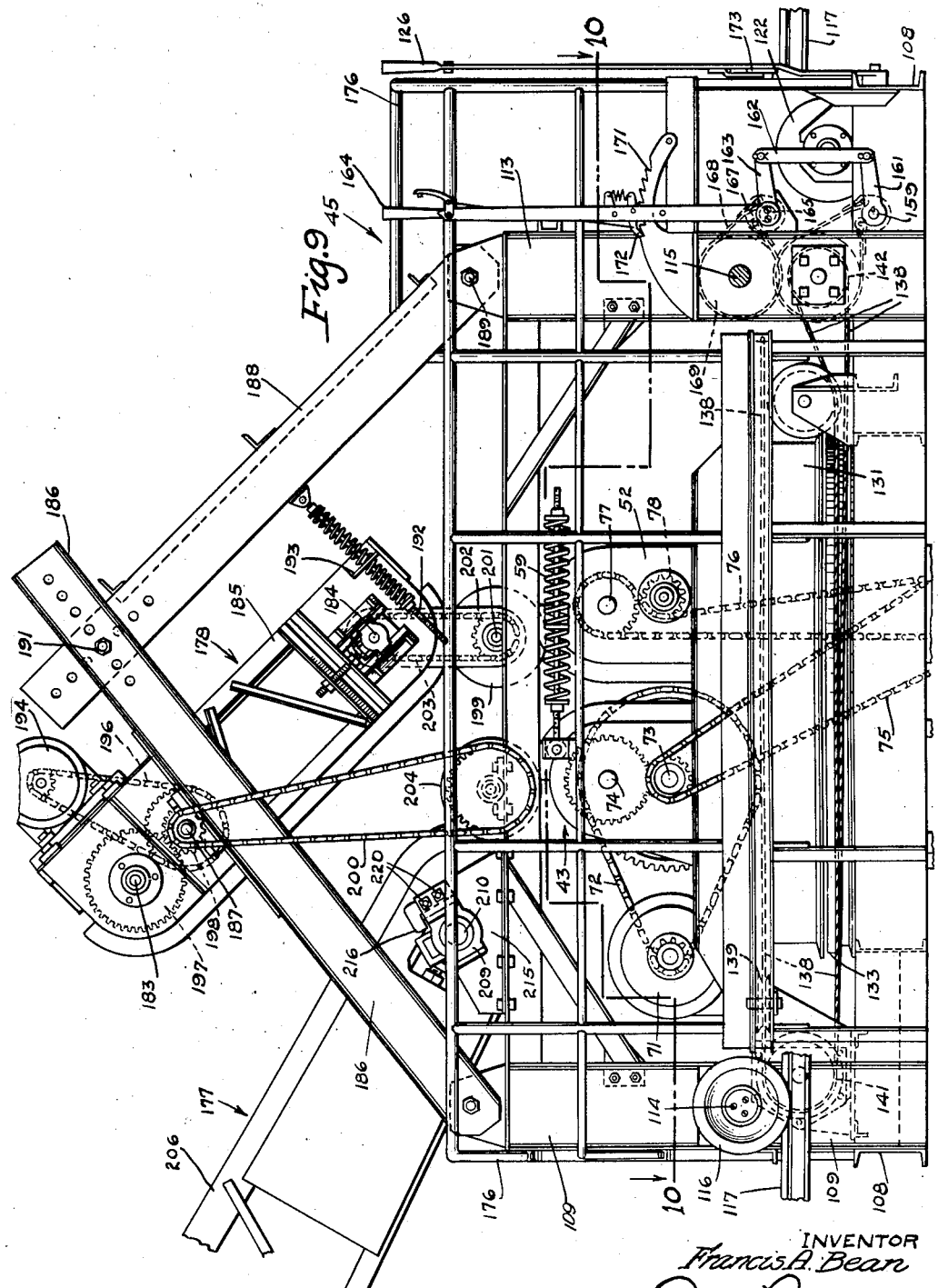

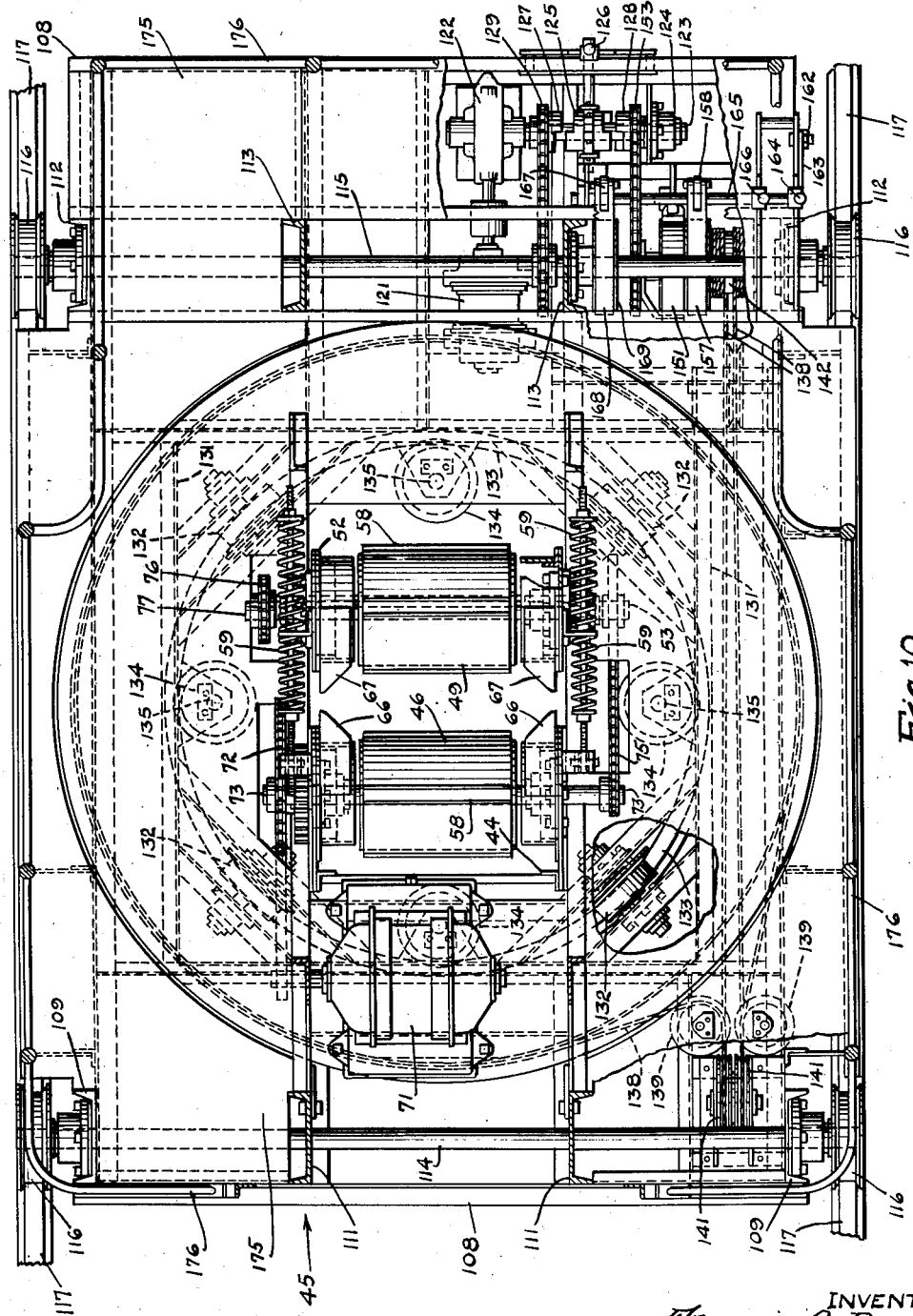

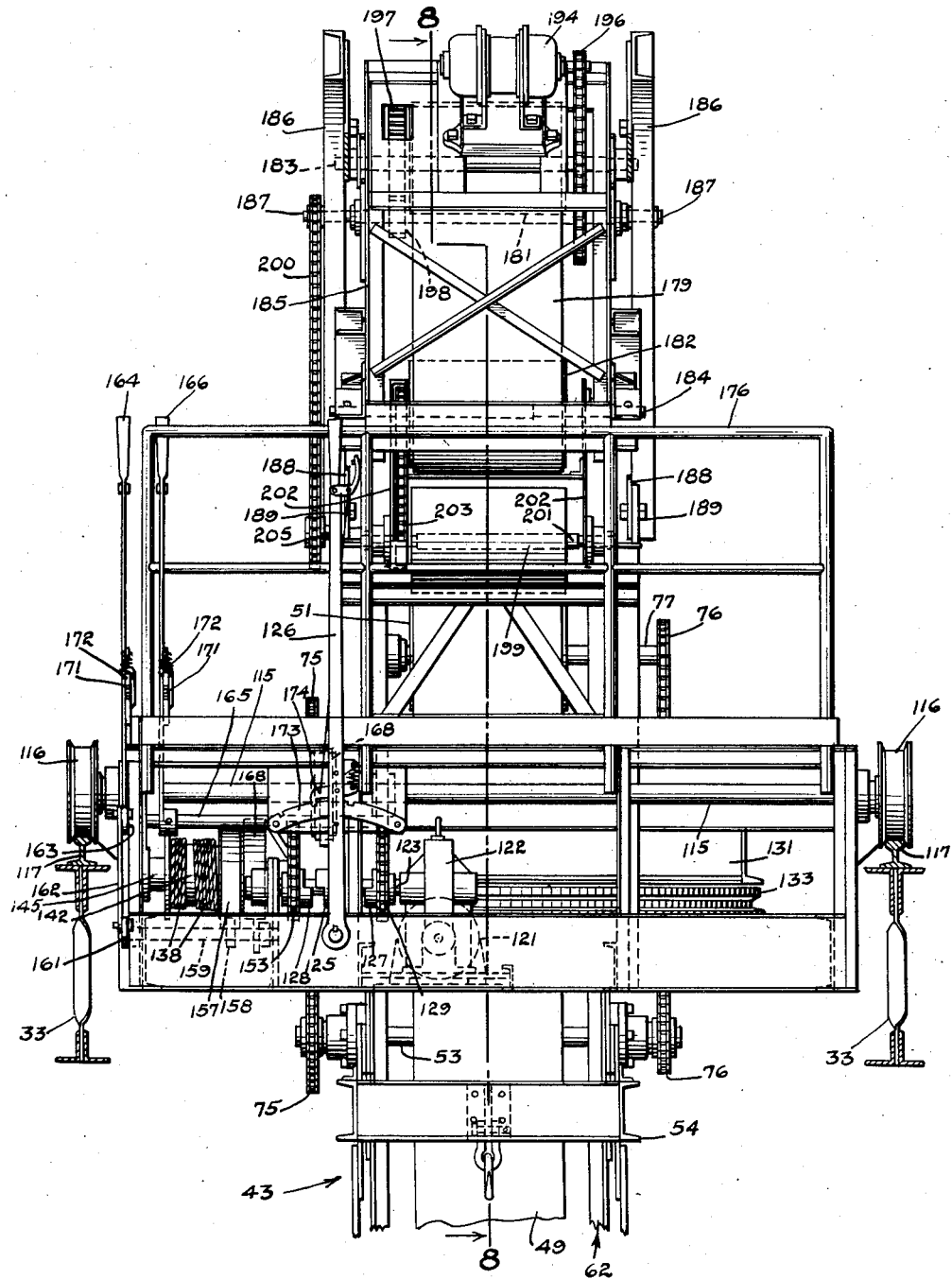

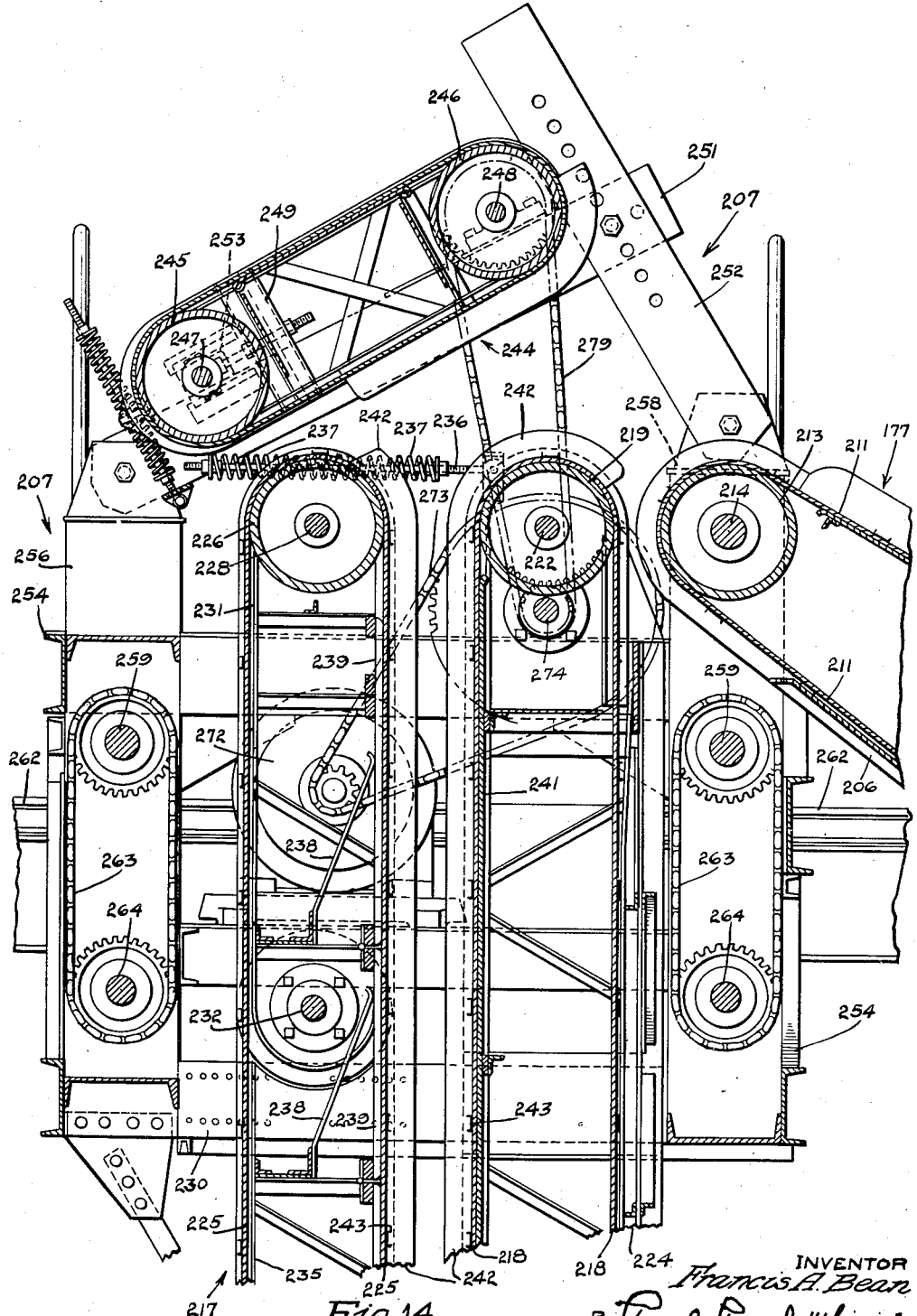

Feb. 19, 1935.  F. A. BEAN  1,991,652
CONVEYING SYSTEM
Filed Feb. 13, 1933    21 Sheets-Sheet 12

INVENTOR
Francis A. Bean
BY
ATTORNEYS

Feb. 19, 1935. F. A. BEAN 1,991,652
CONVEYING SYSTEM
Filed Feb. 13, 1933 21 Sheets-Sheet 13

INVENTOR
Francis A. Bean
BY Paul Paul & Moore
ATTORNEYS

Feb. 19, 1935.  F. A. BEAN  1,991,652
CONVEYING SYSTEM
Filed Feb. 13, 1933  21 Sheets-Sheet 14

INVENTOR
Francis A. Bean
By Paul, Paul & Moore
ATTORNEYS

Feb. 19, 1935.  F. A. BEAN  1,991,652
CONVEYING SYSTEM
Filed Feb. 13, 1933  21 Sheets-Sheet 15
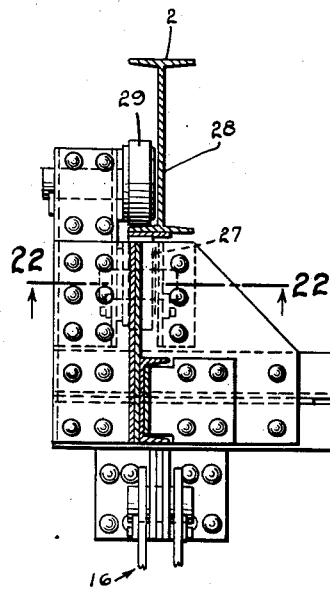
Fig.20
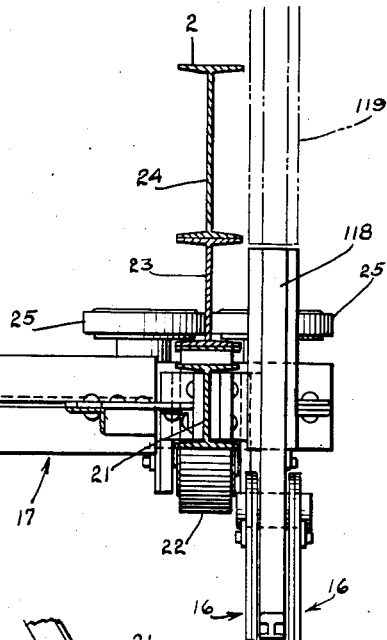
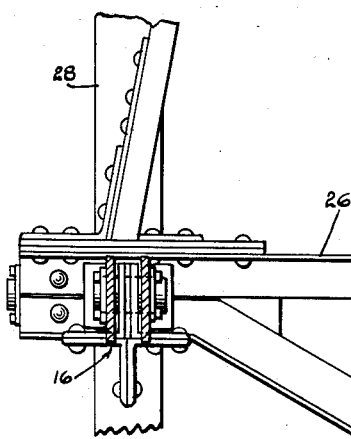
Fig.21
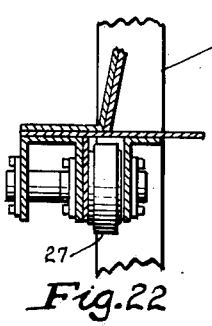
Fig.22
INVENTOR
Francis A. Bean
By
ATTORNEYS

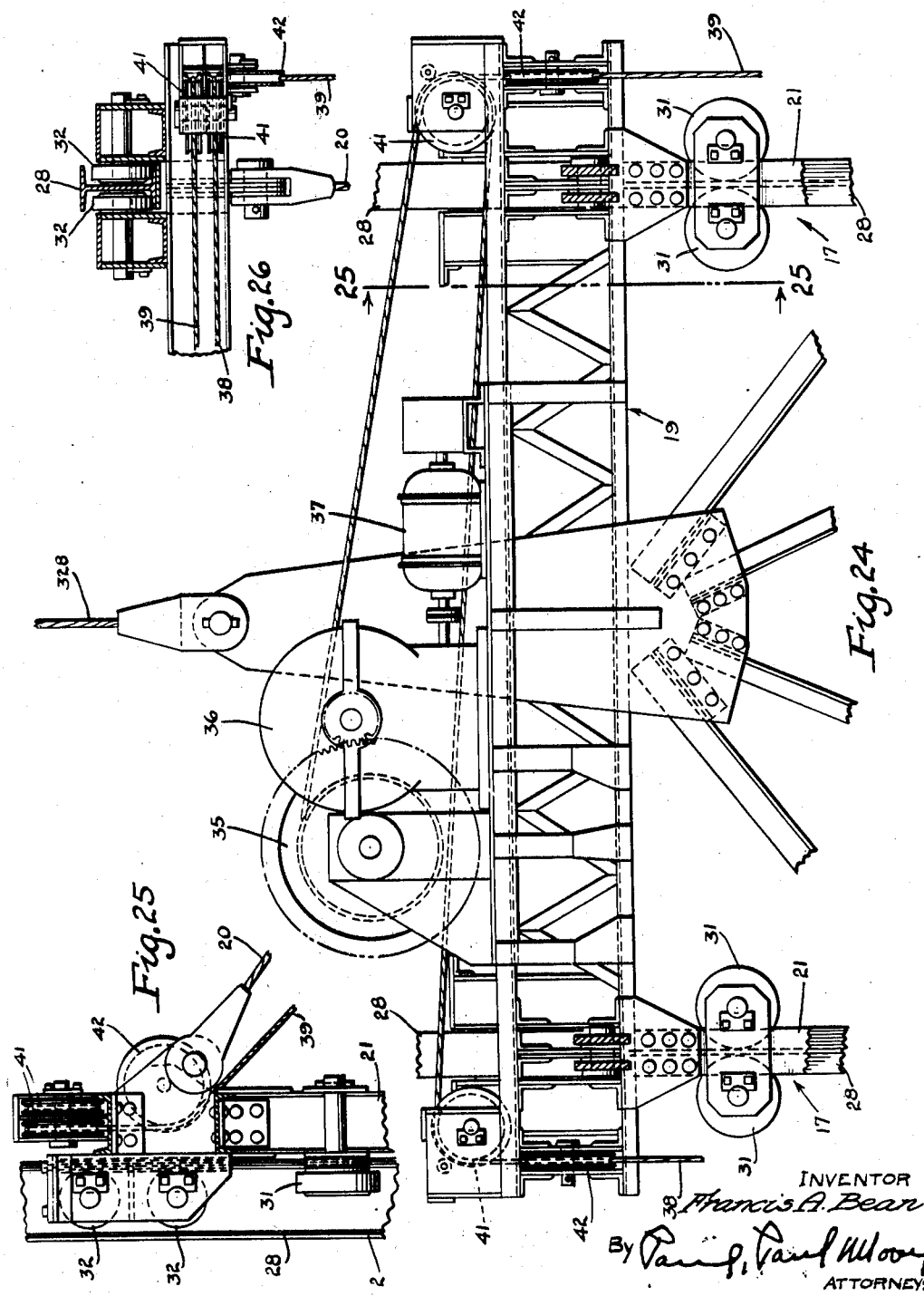

Feb. 19, 1935.　　　　　F. A. BEAN　　　　　1,991,652
CONVEYING SYSTEM
Filed Feb. 13, 1933　　　21 Sheets-Sheet 18
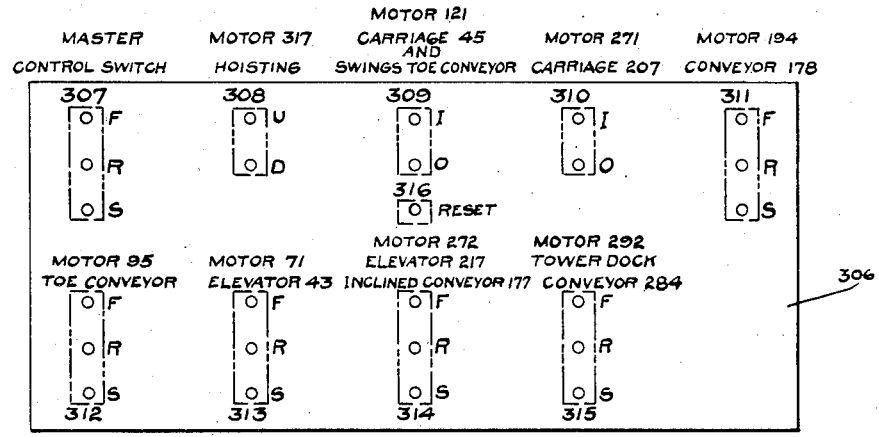
Fig. 29
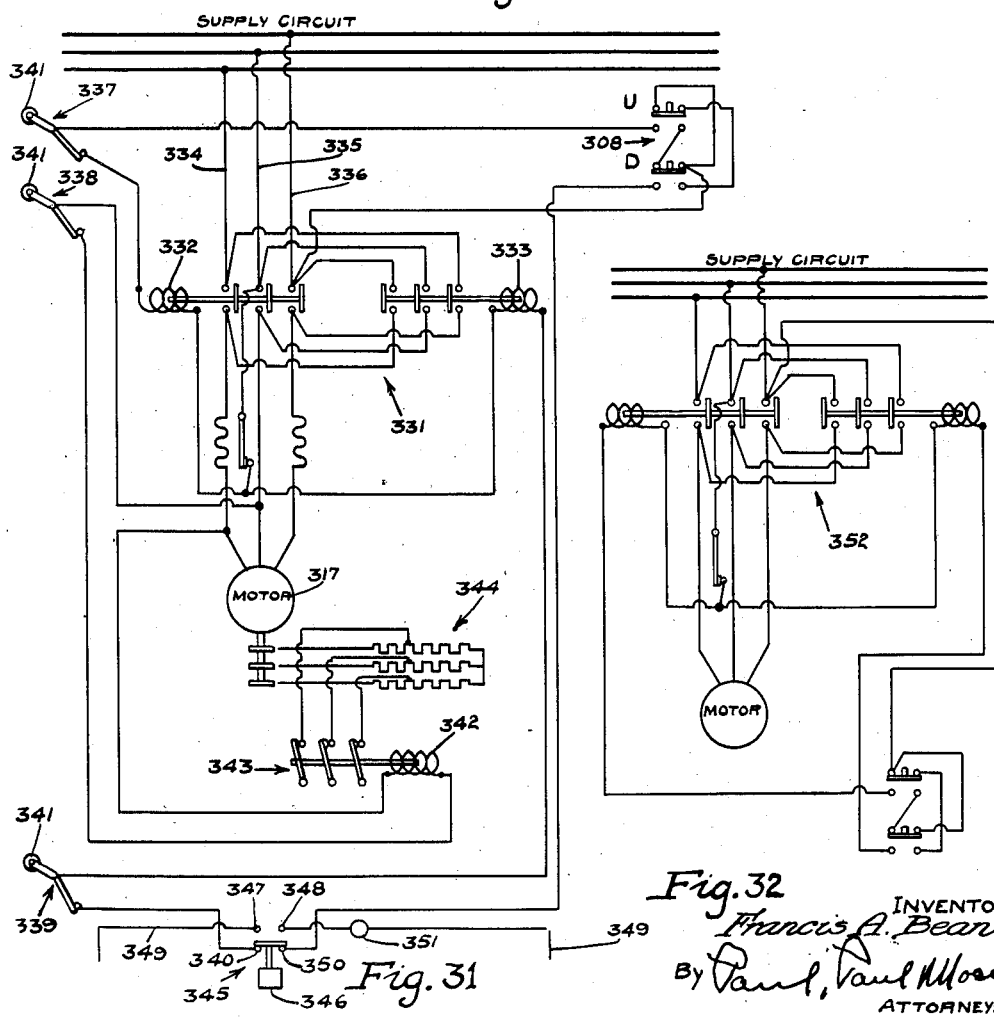
Fig. 31
Fig. 32
INVENTOR
Francis A. Bean
BY
ATTORNEYS Feb. 19, 1935.　　　F. A. BEAN　　　1,991,652
CONVEYING SYSTEM
Filed Feb. 13, 1933　　21 Sheets-Sheet 21

INVENTOR
Francis A. Bean
By Paul, Paul Moore
ATTORNEYS

Patented Feb. 19, 1935

1,991,652

UNITED STATES PATENT OFFICE 1,991,652

CONVEYING SYSTEM

Francis A. Bean, Minneapolis, Minn., assignor to International Milling Company, Minneapolis, Minn., a corporation of Delaware Application February 13, 1933, Serial No. 656,534

34 Claims. (Cl. 198—88)

This invention relates to new and useful improvements in conveying systems, and more particularly to such a system adapted for use at docks and other places to convey or transport bags or packages to and from any point of a boat or any point of a warehouse.

Heretofore, loading and unloading of packages or bags into and from ships or boats has usually been accomplished by bundling or bunching the packages in slings or nets and hoisting or lowering them by means of whip lines operated by suitable winches. Attempts have been made to provide a continuous conveying system, but to the best of my knowledge such attempts have been unsuccessful, primarily because of the nature of the apparatus employed. In most such systems, when unloading a ship, the bags or packages are usually first manually transported from the lower portion of the ship's hull to the upper deck, and then loaded onto the conveying system which may convey them to a warehouse or other receiving means. This requires considerable handling and manual labor and is therefore slow and rather wasteful of human labor.

The present invention relates to a novel system and apparatus for handling packages, bags and other commodities, and an object of the invention is to provide such an apparatus comprising a plurality of conveyers so arranged and interconnected that the packages may be transported directly and without interruption, from any point or level of the ship's hull to a suitable storage bin, or to a warehouse located on the dock or adjacent thereto, or transferred to another boat.

A further object of the invention is to provide a conveying system comprising an elevator having a plurality of conveyer belts between the adjacent runs of which packages may be delivered from a suitable horizontal or slightly inclined conveyer provided at the lower ends of said belts, and the supporting structure of said elevator also providing a support for said horizontal or slightly inclined conveyer whereby said elevator and conveyer may be moved about as a unit.

A further object is to provide a pair of vertically disposed belts having their adjacent runs spaced apart so as to receive and convey packages therebetween, said belts being supported from an overhead structure and having a conveyer connected with the lower ends thereof and adapted for swinging movement about a vertical axis, said conveyer operating to feed the packages to or from said vertical belts, the packages being conveyed between said belts by the frictional engagement of the belts therewith.

A further object is to provide a conveying system comprising a plurality of suitable conveyers provided with independent drives and having a novel control system so arranged that a single operator may control the operation of all of said conveyers, and also whereby certain of said conveyers may be operated independently of the others, and in either direction, so that in the event that a portion of the apparatus becomes congested or jammed with packages while in operation, this particular conveyer which may have become congested, may be operated independently of the other to free the packages accumulated thereon.

A further object is to provide an apparatus of the class described comprising a suitable supporting structure having a boom mounted thereon and adapted to overhang a ship or boat, and a vertical elevator being supported from a carriage mounted for traveling movement upon said boom and depending therefrom, means whereby said boom and carriage may be vertically moved as a unit to lower or raise said elevator into or out of a boat, means for moving said carriage and elevator as a unit along said boom, a substantially horizontal conveyer at the lower end of said elevator adapted for swinging movement around the vertical axis of said elevator, means for rolling said carriage and elevator to an inoperative position inside of said structure, means for folding said boom to a position adjacent to said structure to keep the harbor line free from obstruction, when necessary, and means for traveling said structure lengthwise of the dock.

Other objects of the invention reside in the novel construction of the vertical boat conveyer adapted to be lowered into the hull of a boat; in the novel means provided for constantly exerting a pressure against the adjacent runs of the belts of the boat elevator, whereby packages of different sizes may be conveyed by said vertical boat elevator without relatively adjusting the belts thereof; in the provision of the toe conveyer at the lower end of the boat elevator; and in the means for movably supporting said conveyer, whereby it may readily be moved about within the ship or boat and be extended into remote corners of the interior thereof, to thereby facilitate loading and unloading said conveyer; in the means provided for supporting the boat elevator whereby it may be translated both laterally and lengthwise of the boat, and also whereby it may be moved to a position out of the way of the rigging on the upper deck of the ship; in the novel control system provided whereby a single operator stationed on a suitably located platform, may conveniently view and control the operations of the various conveyers constituting the apparatus, and which control system is so arranged that the operator may cause any selected portion of the apparatus to operate in either direction, independently of other portions thereof, and also whereby the controls of the various parts of the apparatus may be so interconnected that the operation of substantially the entire apparatus may be controlled by the manipulation of a single control device; and in the means provided in connection with said control system for automatically interrupting the up-and-down travel of the boat elevator when it reaches the limit of its movement in either direction, and also in the provision of the signaling means provided for apprising the operator, when the lower end of the boat elevator engages an obstruction when lowered into or over a boat.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings,

Figure 1A is a plan view showing a portion of the outer end of the boom and the cross member provided at the outer end thereof;

Figure 3 is an enlarged detail sectional view of the upper portion of the supporting tower showing the means for raising and lowering the boom;

Figure 6 is a sectional plan view on the line 6—6 of Figure 4;

Figure 7 is a plan view of the outer end of the toe conveyer;

Figure 9 is a side elevation of the carriage for supporting the boat elevator, and also showing the means thereon for operating said carriage and also the belts of the boat elevator;

Figure 10 is a sectional plan view on the line 10—10 of Figure 9, showing the means for swinging the toe conveyer and also for translating the carriage;

Figure 11 is a front view of Figure 9, showing the rails provided on the boom for supporting the boat elevator carriage;

Figure 12 is a detail sectional view showing the general construction of the drum for swinging the toe conveyer, and also showing the means for driving said drum;

Figure 13 is a cross sectional view on the line 13—13 of Figure 12;

Figure 14 is a vertical sectional view on the line 14—14 of Figure 16, showing the upper end of the dock elevator;

Figure 20 is an enlarged sectional plan view on the line 20—20 of Figure 1, showing one side of the boom-supporting frame, and the means for guiding the latter in its up-and-down movements;

Figure 21 is an enlarged detail sectional view on the line 21—21 of Figure 1;

Figure 22 is a detail sectional view on the line 22—22 of Figure 20;

Figure 24 is a front view of the cross head provided at the upper end of the boom supporting frame, showing the means for swinging the boom to an upright position when not in use;

Figure 25 is a detail sectional view on the line 25—25 of Figure 24, showing the means for guiding the upper portion of the boom supporting frame;

Figure 26 is a sectional plan view of the right hand end of Figure 24;

Figure 29 is a front view of a suitable control panel;

Figure 30 is a wiring diagram showing a portion of the control system;

Figure 31 is a wiring diagram showing the electrical connections between the electrical devices used in connection with the motor for controlling the hoisting, or raising and lowering of the boom and boat elevator;

Figure 32 is a wiring diagram showing of one of the motor switches of the control system;

Figures 1 to 3

Supporting structure (tower)

Figure 1:
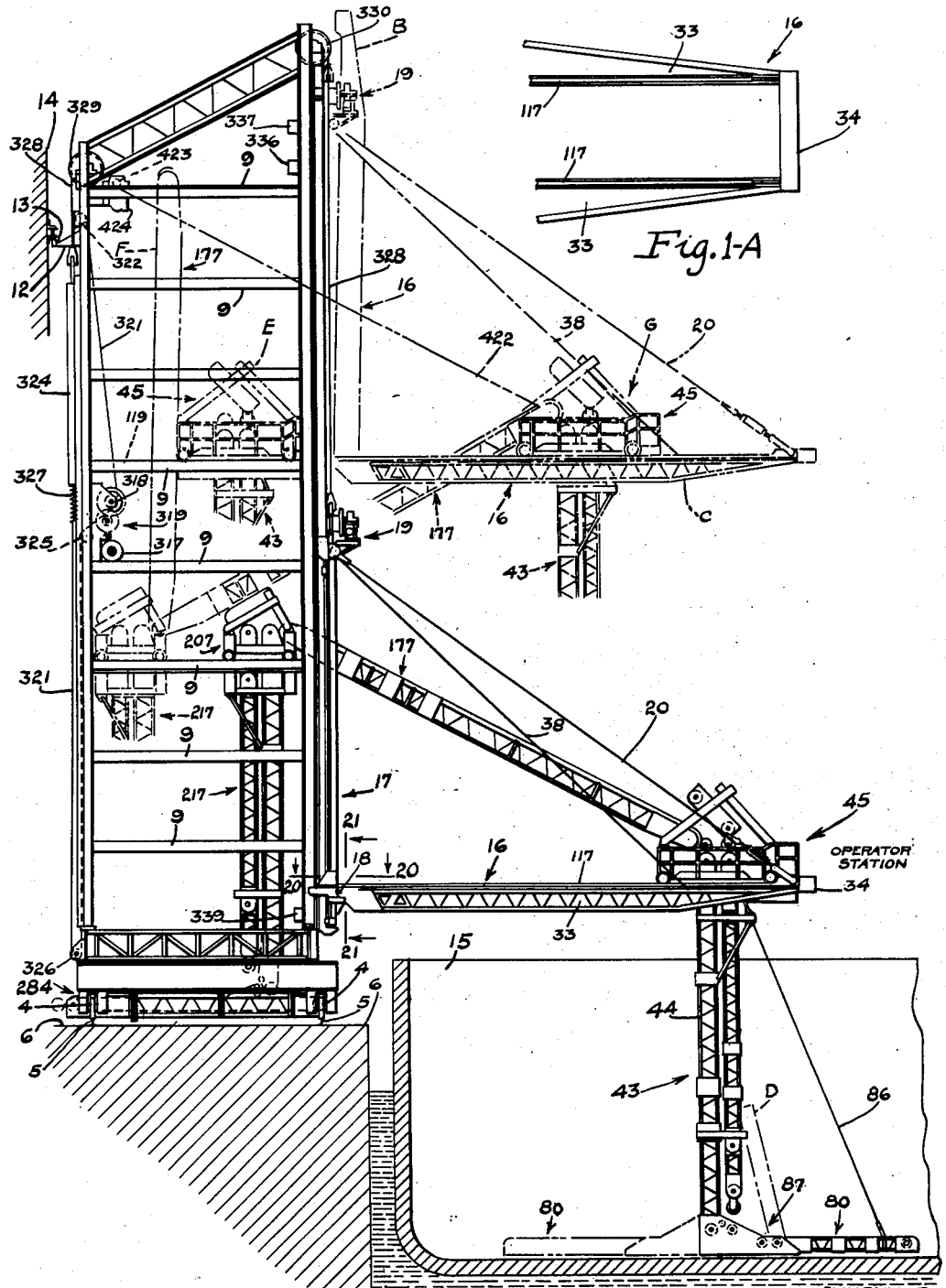
Figure 1 is a side elevation of an apparatus embodying my invention and showing the boat elevator lowered into a boat, and also indicating in dotted lines, an elevated position of the elevator.

The novel conveying system herein disclosed is shown comprising an upright supporting structure which will hereinafter be referred to as the tower. This tower is shown comprising a pair of structural frames 2 mounted upon and secured to a suitable truck frame 3, shown mounted upon wheels 4 adapted to travel upon rails 5 which preferably are provided upon the dock 6. The upper ends of the structural side frames 2 are suitably secured together by cross members 7 and brace members 8.

Each side frame 2 is shown comprising a plurality of horizontally disposed frame members 9 and 11, which may be provided with suitable diagonal braces, not shown, for stiffening the structure. Brackets 12 are shown secured to the rear upper portions of the two side frames 2 and are adapted to engage a guide rail 13 which may be secured to a suitable support 14, such as the wall of a building. The brackets 12 and guide rail 13 prevent the tower from accidentally tipping forwardly over the boat 15, when the boat elevator, which will subsequently be described, is positioned for loading or unloading a boat 15, as shown in Figure 1.

Figures 1, 2, 20 to 26

Boom and supporting frame

Figure 23:
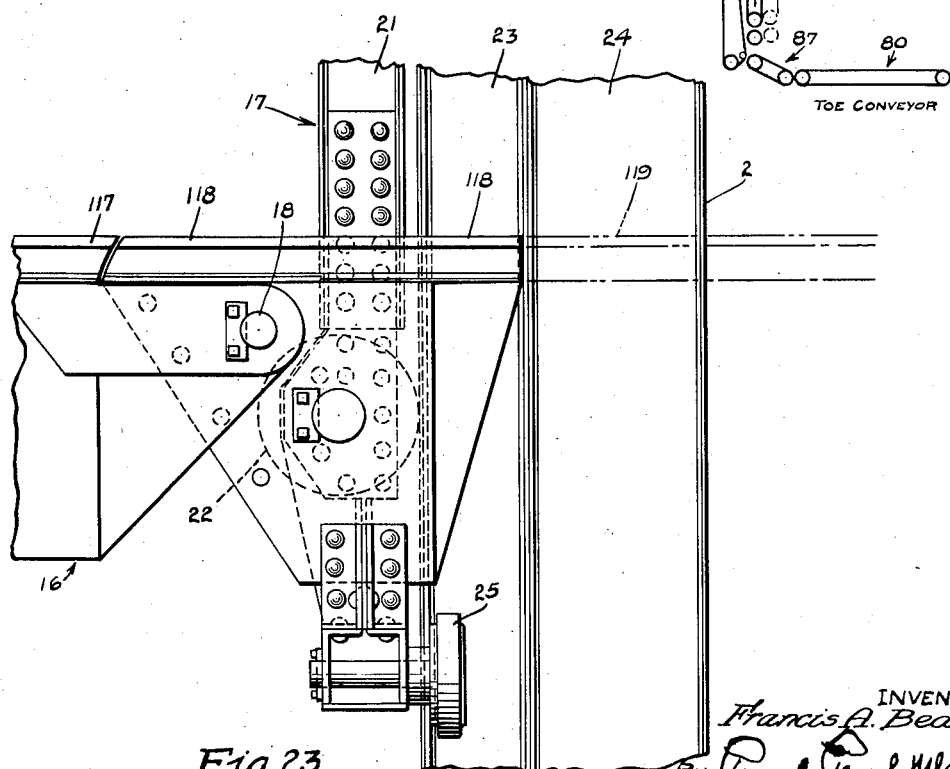
Figure 23 is a side view of Figure 21, looking at it from the right hand side to show the pivotal connection between the boom and its supporting frame.

A boom 16 is shown having one end pivotally supported upon an upright supporting frame 17, as indicated at 18 in Figures 1 and 23, and has its opposite end supported by suitable cables 20, each having one end secured to the outer end of the boom, and having their opposite ends secured to a cross head 19 provided at the upper portion of the supporting frame 17.

The boom supporting frame is mounted for vertical movement upon the structural frames 2—2 of the tower, and is provided at its lower end with suitable wheels 22 adapted to travel upon suitable rails 23 secured to the inner upright members 24 of the side frames 2—2 of the tower, as best shown in Figures 20 and 21. Wheels or rollers 25 are mounted upon the lower portions of the upright supporting frame 17 and are adapted to engage the webs of the I-beam rails 23 to thereby guide the frame 17 in its vertical movement.

To strengthen the lower portion of the supporting frame 17, suitable lateral extensions 26 are secured to the lower ends of the uprights 21 and have wheels 27 provided at the outer ends thereof adapted to travel on the front web of the upright frame members 28 of the side frames 2 of the tower, as shown in Figure 22. Similar wheels or rollers 29 engage the rear faces of the webs of the uprights 28, as shown in Figure 20, and cooperate with the wheels 27 to guide the supporting frame 17 in its up-and-down movements. Suitable anti-friction wheels 31 and 32 are also provided at the upper end of the supporting frame 17 to guide said frame upon the uprights 28 of the tower frames 2—2.

The boom 16, as shown in Figure 1A, may comprise two side members 33, the rear ends of which are pivoted to the upright supporting frame 17, as hereinbefore stated. The outer or forward ends of said members are secured together by a suitable cross member 34.

The boom is adapted to be folded upwardly against the tower, as indicated by the dotted lines B in Figure 1. The means for thus folding the boom is shown in Figures 1 and 24, and comprises a winding drum 35 mounted upon the cross head 19 of the supporting frame 17, and having an operative connection with a suitable gear reducer 36, adapted to be driven from a motor 37. Suitable cables 38 and 39 have their lower ends connected with the forward ends of the boom side members 33—33, as indicated in Figure 1, and have running connections with suitable sheaves 41 and 42 provided at the ends of the cross head 19. The upper ends of the cables 38 and 39 are wound about the drum 35. Thus, it will be seen that when the drum 35 is rotated in one direction, the cables will be wound thereon, whereby the boom will be swung upwardly from the horizontal position shown by the dotted lines C in Figure 1, to the dotted line position B in this same figure. To lower the boom to its horizontal position, the drum is rotated in the opposite direction. It is to be understood that the motor 37 is of the usual reversible type.

Figures 1, 2, 4, 8, 27 and 28

Boat elevator

Figure 2:
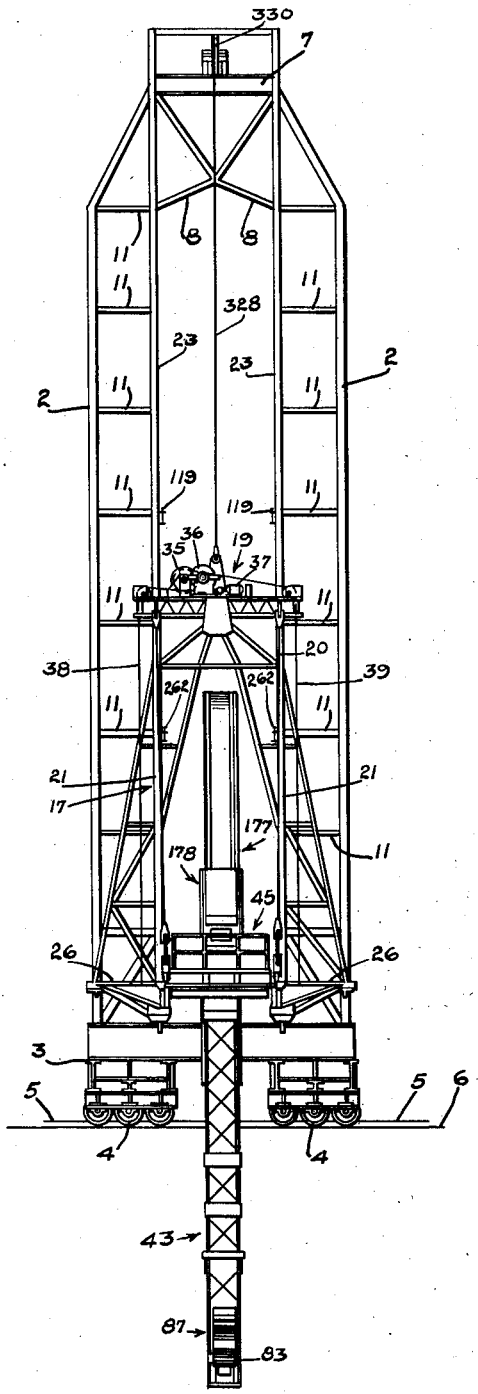
Figure 2 is a front view of Figure 1.
Figures 4, 5:
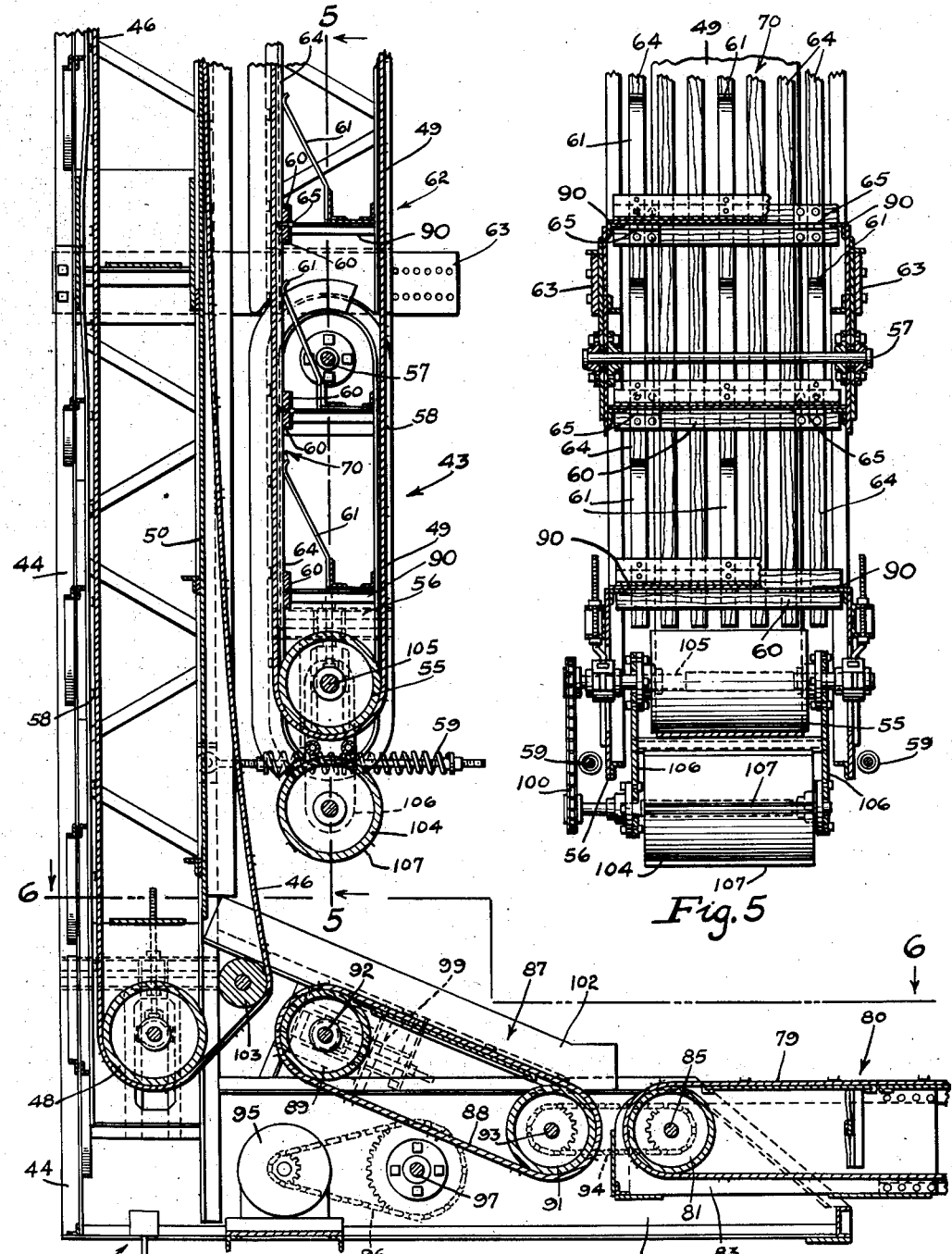
Figure 4 is a sectional view on the line 4—4 of Figure 6, showing the connection between the boat elevator and the toe conveyer, and also the means for driving the conveyer.
Figure 5 is a vertical sectional view on the line 5—5 of Figure 4, showing the means for exerting pressure against the inner run of one of the belts of the boat elevator.

An important feature of this invention resides in the construction of the boat elevator, indicated generally by the numeral 43 in Figures 1 and 2. This elevator comprises a structural frame 44 suspended from a suitable carriage 45, later to be described. A conveyer belt 46 has its upper portion supported upon a pulley 47, mounted in the carriage 45, and the lower portion of said belt is supported upon a similar pulley 48 mounted at the lower end of the frame 44, as best shown in Figure 4. The inner run of the belt 46 is shown suitably supported by means of a backing plate 50, secured in position in the frame 44. A second conveyer belt 49 is shown having its upper portion supported upon a pulley 51, mounted for swinging movement about the axis of a shaft 53 supported in a frame 62, shown supported upon a pair of horizontal members 54, secured to the frame of the carriage 45. The lower portion of the belt 49 is engaged with a pulley 55 supported in a frame 56, which is similarly mounted for swinging movement about the axis of a shaft 57, provided in the lower portion of the frame 62. Suitable transverse cleats 58 are provided upon the belts 46 and 49, as indicated in the drawings.

Figure 27:
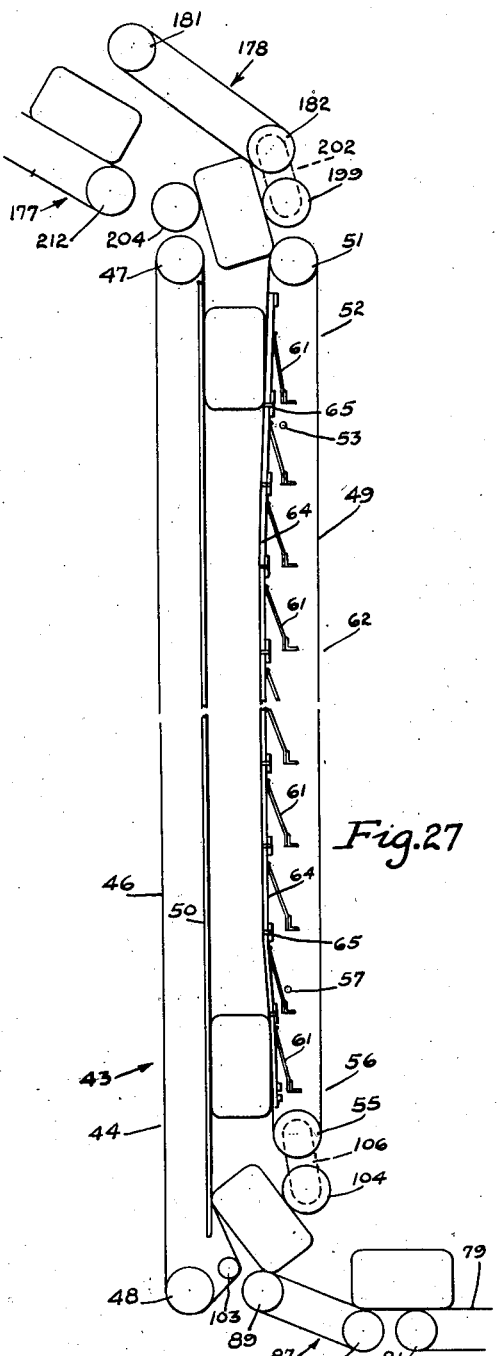
Figure 27 is a diagrammatic view showing the boat elevator and the connection between the lower end thereof and the toe conveyer, and also the means provided at the upper end of the boat elevator for guiding the packages therefrom onto the inclined conveyer.

The adjacent runs of the two belts 46 and 49 are spaced apart as shown, and are adapted to receive and convey bags or packages therebetween, as clearly illustrated in Figure 27. The pivoted frame sections 52 and 56 which support the rollers 51 and 55, respectively, are normally retained in the positions shown in Figures 4 and 8, by suitable springs 59, and the inner run of the belt 49 is supported by a plurality of yieldable elements 61 mounted in the frame 62 which supports the belt 49. This frame is shown adjustably secured to the horizontal members 54 of the carriage, and similar horizontal members 63 provided adjacent the lower end of the leg.

Figure 8:
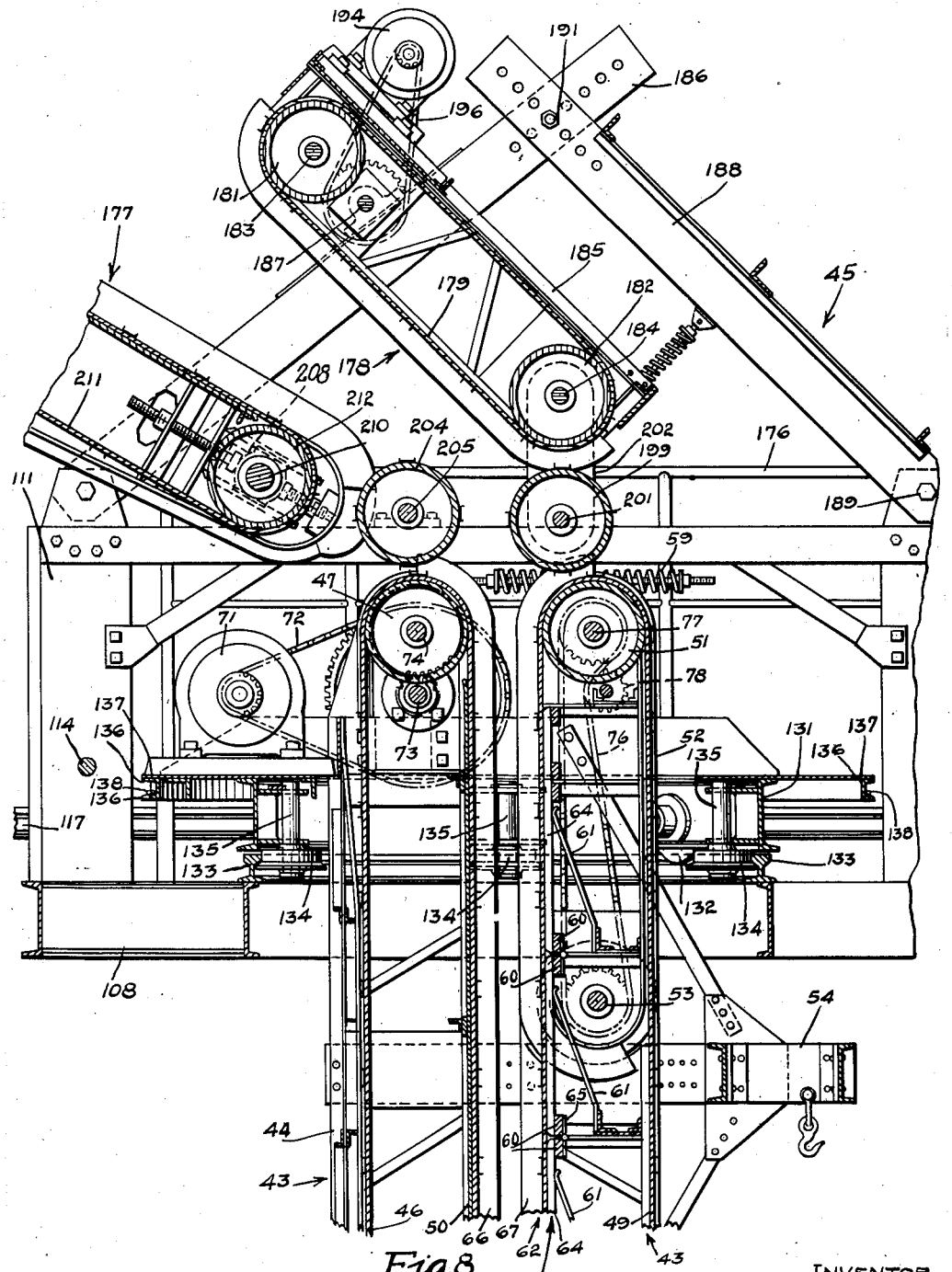
Figure 8 is a vertical sectional view on the line 8—8 of Figure 11, showing the relative positions of the conveyer belts and rollers provided at the upper end of the boat elevator.

The yieldable elements 61 engage a series of upright slats 64 secured together in spaced relation by suitable cleats or strips 60 to provide a plurality of sections 70. These sections are pivotally connected together by suitable hinges 65, as shown in Figures 4 and 8. The slats 64 extend substantially the full length of the inner run of the belt 49, and are held in constant contact with the belt by the resilient elements 61. Because of the slats being secured together in sections and said sections being pivoted together as above described, the entire width of the belt will be supported by said slats so that when a package or bag is fed upwardly or downwardly between the adjacent runs of the two belts, the adjacent run of the belt 49 may yield against the pressure of the resilient element 61 acting upon the slats 64. The spacing between the adjacent runs of the two belts is such that the frictional engagement of the belts with the bags or packages is sufficient to elevate the bags between said belts, as indicated in Figure 27. The hinged-together sections 70 are shown held against vertical movement by suitable supporting members 90, preferably of angle iron cross-section, and having their inwardly projecting webs fitting the cross cleats 60, as shown in Figures 4 and 5.

In Figures 4 and 8, I have shown the frame 62 which supports the belt 49 as being mounted for horizontal adjustment with respect to the belt 46, whereby the space between said belts may be varied to suit different sizes of bags. In actual practice, however, I have found that this adjustment may be eliminated by providing resilient elements 61 behind the adjacent runs of both belts. When the belts are thus mounted, the belts will be so spaced apart as to convey the smallest size packages to be handled, and the resilient elements 61 will permit sufficient horizontal movement of the adjacent belt runs to permit bags of comparatively larger sizes to be conveyed therebetween without adjusting the frame 62 relatively to the frame 44 supporting the belt 43. Suitable side rails 66 and 67 are provided at the sides of the conveyer belts 46 and 49, respectively, as best shown in Figure 10.

The means provided for driving the belts 46 and 49 of the elevator 43, is best shown in Figures 8, 9, and 10, and comprises a motor 71 mounted in the carriage 45 and having a suitable chain drive 72 connecting it with a counter shaft 73 provided in the frame of the carriage 45. The shaft 73 is geared to a shaft 74 which supports the pulley 47, so that said pulley will rotate in the opposite direction from that of the shaft 73. The belt 49 is driven by a chain 75 connecting the shaft 73 with the shaft 53, as indicated in Figure 9. A chain drive 76 operatively connects the shaft 77, which supports the pulley 51, with the shaft 53. By thus connecting together the drives of the two belts, it will be noted that the adjacent runs thereof will always travel in the same direction, and the drives are so arranged that the belts will travel at the same speed. A suitable idler sprocket 78 may be provided for taking up slack in the chain 76, and if necessary similar means may be provided for taking up slack in the chain 75.

FIGURES 1 AND 4 TO 7

*Toe conveyer*

Another important feature of this invention resides in the means provided at the lower end of the boat elevator for delivering the packages thereto or conveying them therefrom to the desired destination. Such means resides in the provision of a conveyer 80, which hereinafter will be referred to as the toe conveyer. This conveyer is situated at the lower end of the boat elevator, and comprises a belt 79 mounted upon pulleys 81 and 82 supported in a suitable frame 83. The frame 83 is pivotally supported in the lower portion 84 of the frame 44 of the leg 43, and is adapted to swing about the axis of a shaft 85 which supports the roller 81, whereby the conveyer 79 may be folded upwardly to the dotted line position, indicated at D in Figure 1, or lowered below the horizontal to any degree compatible with frictional conveying of the bags. A suitable cable 86 may be provided for swinging the toe conveyer to its inoperative position. A short inclined conveyer section 87 is interposed between one end of the toe conveyer 79 and the receiving end of the boat elevator 43, as best shown in Figure 4, and comprises a belt 88 mounted upon suitable pulleys 89 and 91, secured to shafts 92 and 93, respectively. The shafts 85 and 93 are operatively connected together by a suitable chain drive 94, in such a manner that the conveyers 80 and 87 will travel in the same direction.

The toe conveyer is driven from a suitable motor 95 mounted in the lower portion of the leg 43, as shown in Figure 4, and has a chain drive 96 operatively connecting it with a counter shaft 97 which, in turn, is operatively connected with the shaft 93 by its chain drive 98. By thus driving the conveyer belts 79 and 87, they will travel in the same direction, and the outer end of the toe conveyer 79 may also be vertically adjusted without interfering with the belt drives. Suitable means 99 is shown provided for taking up slack in the belt 88, and suitable means 101 may also be provided for taking up slack in the toe conveyer belt 79.

Suitable side rails or guides 102 are provided at the sides of the inclined conveyer 87 to guide the bags or packages into the space provided between the adjacent runs of the vertical belts 46 and 49. In order to facilitate guiding the bags or packages into the space provided between the vertical conveyer belts 46 and 49, the lower portion of the belt 46 is shown passing over an idler pulley 103, mounted adjacent to the inclined conveyer belt 88 to assist in guiding the packages between the belts 46 and 49.

Another important feature of the invention resides in the provision of a roller 104, mounted at the lower end of the conveyer belt 49. This roller is pendently supported from the shaft 105 of the roller 55 by suitable arms 106, and is driven by a chain drive 100 which operatively connects it with the roller 55, as clearly shown in Figure 5. The roller 104 rotates in the same direction as the roller 55, and has a plurality of cleats 107 secured to its periphery adapted to cooperate with the belt 46 to feed the packages into the space between the two elevator belts 46 and 49.

FIGURES 1 AND 8 TO 13

*Supporting carriage for boat elevator*

Another important feature of this invention resides in the means for supporting the boat elevator and toe conveyer upon the boom 16, whereby they may be rotated about a vertical axis, as indicated by the full and dotted lines in Figure 1, and also whereby the boat elevator and toe conveyer may be translated upon the boom. By mounting the toe conveyer and boat elevator for rotary movement about a vertical axis, the outer end of the toe conveyer may be positioned in close proximity to the packages or bags to be unloaded from the boat, whereby said packages or bags need not be carried from one place to another, but may be placed directly upon the toe conveyer, whereby they will be conveyed to the boat elevator. In like manner, when the bags or packages are being loaded into the boat, the discharge end of the toe conveyer may be positioned adjacent to the point where the bags or packages are to be stored in the boat.

The means provided for thus supporting the boat elevator resides in the provision of the carriage 45, hereinbefore mentioned, and which comprises a suitable structural frame 108 shown provided at one end with upright channel members 109 and 111, and at its opposite end with similar channel members 112 and 113. A shaft 114 is supported in suitable bearings provided in the channel members 109 at one end of the frame, and a similar shaft 115 is supported in suitable bearings provided in the channel members 112 at the opposite end of the frame. Flanged wheels 116 are secured to the ends of the shafts 114 and 115, and are adapted to travel upon suitable rails 117 provided upon the side members 33—33 of the boom 16, as shown in Figures 9, 10, and 11. When the boom 16 is in its horizontal position, as shown in Figure 1, the rails 117 will be alined with short rail sections 118 secured to the lower portion of the boom supporting frame 17, as best shown in Figure 23. Rail sections 119 are permanently located in the tower at the points indicated in Figures 1 and 2, so that when the boom is moved to the dotted line position C in Figure 1, the carriage 45 may be translated from the boom into the tower to the position indicated by the dotted lines E in Figure 1.

Power means is provided for translating the carriage upon the boom, and may consist of a suitable motor 121 operatively connected with a suitable speed reducer 122 having a shaft 123, one end of which is supported in a suitable bearing 124 supported upon the frame of the carriage. A clutch member 125 is non-rotatably mounted upon the shaft 123, and is adapted for sliding movement thereon by means of a clutch control lever 126 connected therewith in the usual manner. Complemental clutch members 127 and 128 are loosely mounted upon the shaft 123 and are adapted to be selectively engaged by the slidable clutch member 125, by manipulation of the clutch control lever 126. The clutch member 127 has a chain drive 129 connecting it with the shaft 115 so that when said clutch member is operatively engaged with the movable clutch member 125, said shaft will be rotated in one direction or the other, depending upon the rotation of the motor 121, which preferably is of the reversible type.

The means provided for rotating or swinging the toe conveyer and boat elevator about a vertical axis is here shown as comprising a frame 131 provided with suitable carrying wheels 132 mounted to travel upon a circular track 133 secured to the frame 108 of the carriage. Horizontally disposed flanged wheels 134 are supported upon vertical studs 135 mounted in the frame 131, and are adapted to engage the inner surfaces of the circular track 133, as clearly illustrated in Figure 8. The boat conveyer 43 is supported entirely upon the rotatable frame 131, and is independent from the frame 108 of the carriage so that the elevator, at the lower end of which the toe conveyer is supported, may be relatively rotated about the axis of said frame 131, as will be clearly understood by reference to Figures 8 and 10.

In the drawings, I have shown the frame 131 arranged to be rotated by power, and to thus rotate the frame 131, a relatively smaller channel 136 is supported upon the frame 131 by such means as a plate 137. This smaller channel 136 faces outwardly, and is circular in form and provides an enlarged annular groove adapted to receive a cable 138, which passes around said annular channel 136 and has running connections with suitable sheaves 139 and 141 provided at one corner of the carriage, as shown in the lower left hand corner of Figure 10. The ends of the cable 138 are coiled about a suitable winding drum 142 in opposite directions so that when said drum is rotated in one direction, one end of the cable will be unwinding from the drum while the other is being wound thereon, resulting in the frame 131 being rotated in one direction. When the drum is rotated in the opposite direction, the rotary movement of the frame 131 will also be reversed.

The drum 142 is shown provided with a hub 143, which is loosely mounted upon a shaft 144 supported in bearings 145 and 146 on the frame 108 of the carriage, as best shown in Figures 12 and 13. A sprocket 147 is shown secured to a hub 148 which may be suitably fixed to the shaft 144 by such means as a set screw 150. The hub 148 has an arm 149 thereon adapted to support a suitable friction band 151 encircling a brake drum 152 provided on one end of the drum 142. A chain 153 operatively connects the sprocket 147 with the clutch member 128, so that when said clutch member is rotated as a result of being engaged by the movable clutch member 125, the shaft 144 will be rotated. The ends of the band 151 are operatively connected by a bolt 154 having a suitable spring 155 mounted thereon which constantly urges the band into frictional engagement with the drum 152. By relatively adjusting the nut 156 of the bolt 154, the tension of the spring 155 may be adjusted whereby the band 151 will have the proper frictional contact with the drum to drive the latter when the arm 149 is rotated by rotation of the sprocket 147. It is also to be understood that the tension in the spring 155 is so adjusted that should the mechanism meet with an obstruction, the band 151 will slip on the drum 152, whereby damage to the structure is avoided.

A brake band 157 is mounted upon the brake drum 152, as shown in Figure 12, and has one end operatively connected to an arm 158 secured to a shaft 159 mounted in suitable bearings provided in the carriage frame 108. An arm 161 is secured to the outer end of the shaft 159, and has a link 162 connecting it to an arm 163 provided at the lower end of an operating lever 164, which preferably is loosely mounted upon one end of a shaft 165, supported in the carriage frame.

A second lever 166 is secured to the shaft 165 whereby said shaft may be conveniently rocked in its bearings. The shaft 165 has an arm 167 secured thereto adapted to operate a brake band 168 encircling a brake drum 169 secured to the shaft 115. The brake band 168 and drum 169 control the movement of the carriage upon the rails 117 when the lever 166 is oscillated. The control levers 165 and 166 are provided with suitable quadrants 171 and latches 172 for retaining them in adjusted positions. The clutch lever 126 is similarly provided with a notched quadrant 173 adapted to be engaged by a dog 174 carried by the lever. In Figure 11, the levers are shown in their normal inoperative positions.

A suitable plate or floor 175 is secured to the carriage frame 108 above the brakes 157 and 168, and the clutch mechanism, to provide a suitable station for an operator. This floor 175 may cover the major portion of the carriage frame 108 so that the operator may move about from place to place on the carriage to view the operation of the apparatus. A suitable railing 176 is shown provided around the operator's station and at the sides of the carriage, as best shown in Figures 9 and 11.

Means is provided at the upper end of the boat elevator 43 for deflecting or diverting the bags or packages from the upper end of the elevator onto an inclined conveyer 177 which will subsequently be described.

Such means is best shown in Figure 8, and comprises a short, inclined conveyer 178 comprising a belt 179 mounted upon a pair of rollers 181 and 182 carried by shafts 183 and 184, respectively. The rollers 181 and 182 are supported in a suitable frame 185 shown pivoted to an inclined supporting member 186 by means of a shaft 187. The inclined supporting member 186 is adjustably secured to a similar member 188 pivoted to the carriage frame at 189. The upper ends of the supporting members 186 and 188 are shown adjustably secured together by means of bolts 191. The lower end of the conveyer 178 may be relatively adjusted with respect to the discharge end of the boat elevator 43 by means of threaded rods 192 each having one end pivotally connected to the supporting member 188 and passing through apertured lugs 193 provided in the frame 185 of the conveyer 178.

A motor 194 is mounted upon the upper end of the frame 185 and has a drive chain 196 operatively connecting it with one end of the shaft 187. The shaft 187 is operatively connected to the shaft 183 by suitable gears 197 and 198.

A roller 199 is mounted upon a shaft 201 pendently supported beneath the shaft 184 by suitable arms 202. A chain drive 203 operatively connects the shaft 201 of the roller 199 with the shaft 184. A similar roller 204 is non-rotatably mounted upon a shaft 205 and has a plurality of cleats on the periphery thereof, as shown in Figure 8. Roller 205 may be driven from shaft 187 by a chain 200. The rollers 199 and 204 cooperate with the conveyer 178 to guide the bags or packages onto the receiving end of the inclined conveyer 177, when the apparatus is operated to unload a boat. Conversely, when the apparatus is being used for loading a boat, rotation of all of the conveyer belts will be reversed, whereby the rollers 199 and 204 will cooperate to guide the bags or packages into the boat elevator 43.

In the drawings, I have shown the toe conveyer and boat elevator as being provided with power means for swinging the toe conveyer. In actual practice, however, it has been found that, the toe conveyer may readily be manually swung about its vertical axis, so that an attendant stationed in the bottom of the boat may readily push or move the end of the toe conveyer from one place to another for the convenience of loading packages onto the toe conveyer, or unloading them therefrom. When the clutch lever 126 is in the position shown in Figures 10 and 11, the clutch members 127 and 128 are in inoperative positions, whereby an operator stationed at the lower portion of the apparatus may readily swing the toe conveyer about its axis, as above stated.

FIGURES 1, 8, 14, 15, AND 28

*Inclined conveyers*

The inclined conveyer 177, hereinbefore mentioned, comprises a suitable elongated frame 206 having one end pivotally mounted upon its carriage 45 and its opposite end upon a carriage 207, mounted in the tower. The inclined conveyer 177 comprises a belt 211 having one end mounted upon a pulley 212, and the other end upon a similar pulley 213, mounted upon a drive shaft 214 supported in the frame of the carriage 207.

The roller 212 of the inclined conveyer 177 is mounted upon a shaft 210 journaled in suitable bearings 208 provided in the frame 206. The ends of the shaft 210 extend beyond the bearings 208 and are provided with bearings 209 adapted to be received in suitable supports 215 provided in the frame of the carriage 45. The bearings 209 are removably retained in the supports 215 by suitable hooks 216, best shown in Figure 9. The hooks 216 are shown secured in position by bolts 220. By thus supporting the lower end of the inclined conveyer 177 upon the carriage 45, it may readily be detached therefrom, and swung to the dotted line position, indicated at F, in Figure 1.

FIGURES 1, 14 TO 19, AND 28

*Dock elevator and carriage*

Figure 17:
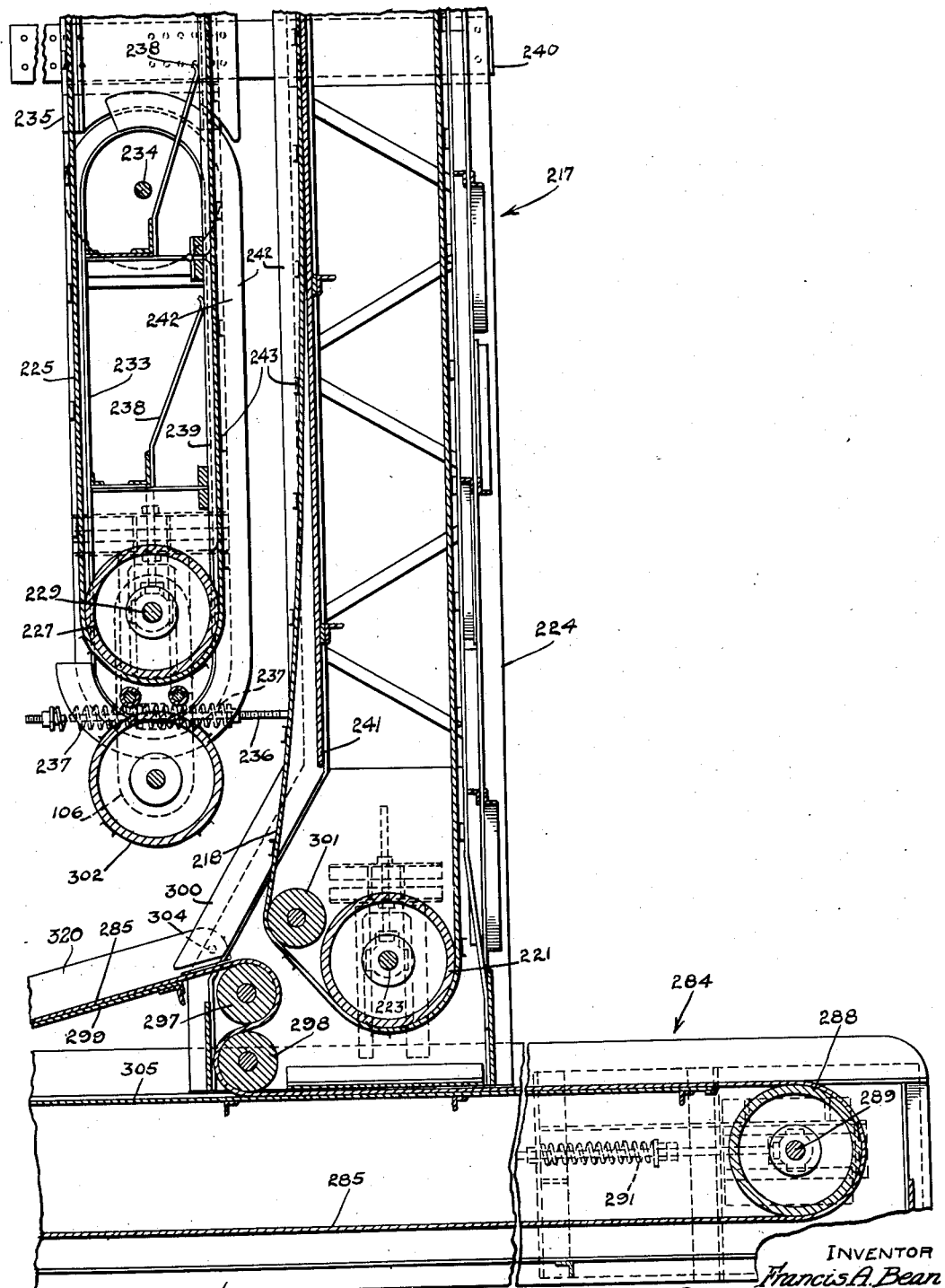
Figure 17 is a vertical sectional view of the lower end of the dock conveyer.
Figure 18:
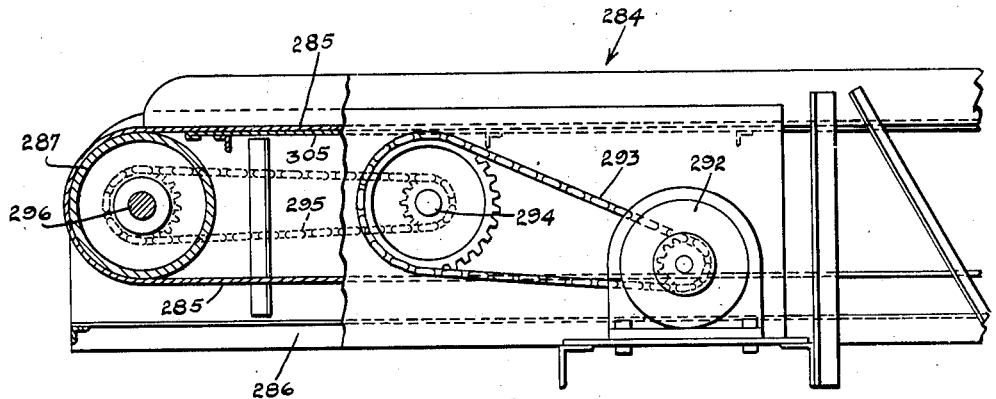
Figure 18 is a side elevation, partially in section, of the outer end of the horizontal conveyer provided at the lower portion of the dock elevator.
Figure 19:
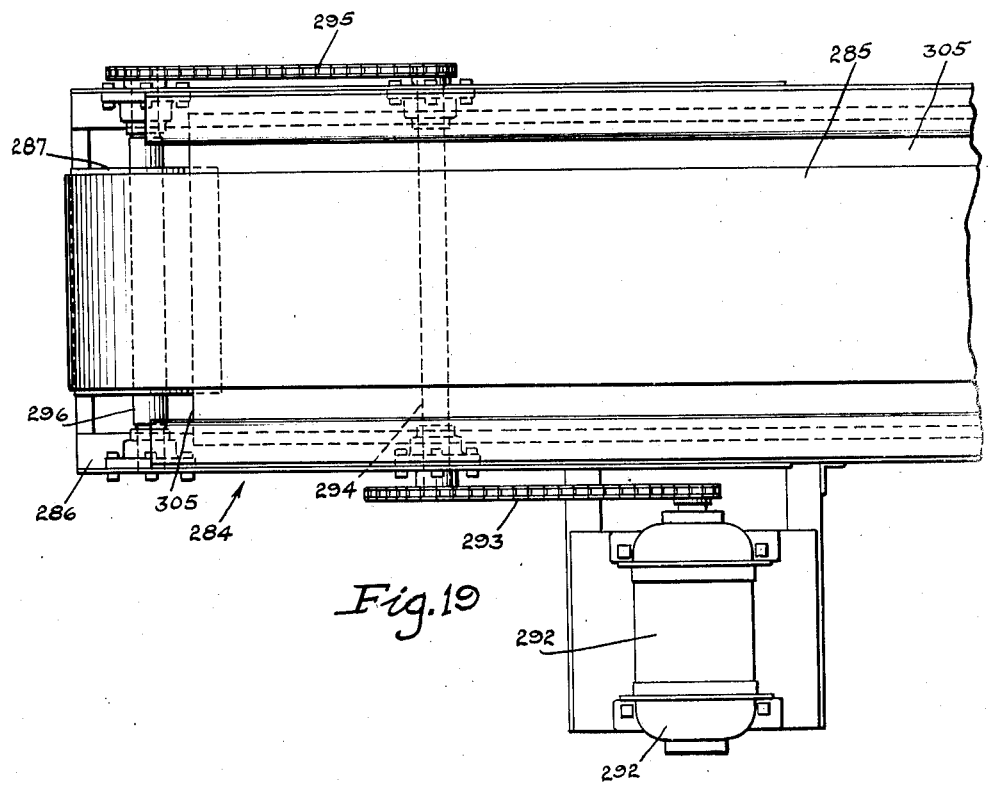
Figure 19 is a plan view of Figure 18.
Figure 28:
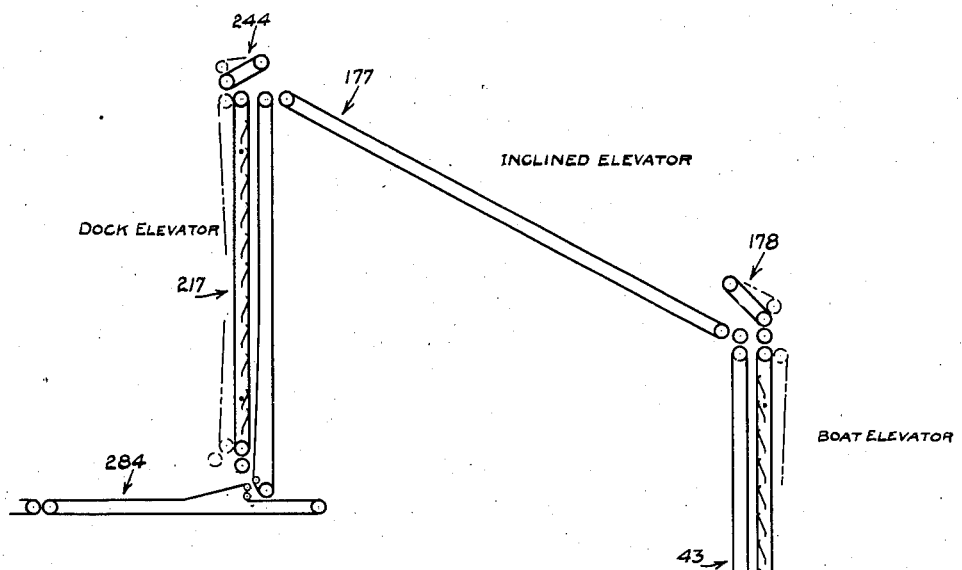
Figure 28 is a diagrammatic view showing the general arrangement of all of the conveyer belts of an apparatus such as illustrated in Figure 1.

Means is shown provided on the carriage 207 for conveying the packages or articles received from the inclined conveyer 177 downwardly onto a suitable receiving means provided upon the dock. Such means is best illustrated in Figures 14 and 17, and comprises a vertically disposed elevator generally indicated by the numeral 217. This elevator, like the boat elevator 43, comprises an endless conveyer belt 218 mounted upon suitable pulleys 219 and 221 secured to shafts 222 and 223, respectively. The pulley 219 is supported in a vertical frame or leg 224 having its upper end secured in the frame of the carriage 207, and the pulley 221 is mounted in the lower portion of the vertical frame 224.

A second conveyer belt 225 is mounted upon pulleys 226 and 227 secured respectively to shafts 228 and 229. The shaft 228 is supported in the upper end of a frame 231, and is mounted for swinging movement about the axis of a shaft 232, rotatably mounted in suitable bearings provided in a frame 235. The shaft 229 is mounted at the lower end of a frame 233 which is pendently supported from a shaft 234 secured to the lower end of the frame 235. The frame 235, upon which the pivoted frame sections 231 and 233 are supported, is adjustably mounted upon suitable horizontal supporting members 230 and 240, provided upon the fixed leg or frame 224 and the carriage 207, as shown in Figures 14 and 17. Suitable rods 236 are pivoted to the frame 224 and operatively engage the swinging ends of the frame sections 231 and 233, as shown in Figures 14 and 17. Suitable springs 237 are coiled about the rods 236 and yieldably retain said frame sections in operative positions.

The inner run of the belt 225 is shown supported in a manner similar to the corresponding run of the belt 49, by means of a plurality of resilient elements 238 having their free ends bearing against a series of hinged-together sections 239, which may be constructed of suitable slats positioned to bear against the belt, as clearly shown in Figures 14 and 17. A suitable backing plate 241 is also shown provided back of the inner run of the belt 218 and retains said belt run in operative position when a bag or package is being conveyed by said belts. Suitable side rails 242 are provided at the side edges of the adjacent runs of the belts 225 and 218 to retain the bags therebetween. These belts, like those of the boat elevator, are provided with suitable transverse cleats 243.

A short inclined conveyer section 244 is provided at the upper end of the dock conveyer 217 to guide the packages from the inclined conveyer 177 into the space between the conveyer belts 218 and 225. This short inclined conveyer belt is supported upon rollers 245 and 246 mounted upon shafts 247 and 248 respectively. The shaft 247 is supported in the lower end of a frame 249 which is pivotally mounted upon a supporting member 251, and is adapted to swing about the axis of the shaft 248. Brace members 252 are shown pivotally mounted upon the frame of the carriage 207, and are adjustably connected to the supporting members 251 whereby said members may be relatively adjusted to vary the angle of the conveyer 244. Suitable means 253 may be provided in connection with the pulley 245 for taking up slack in the belt of the conveyer 244.

Figure 15:
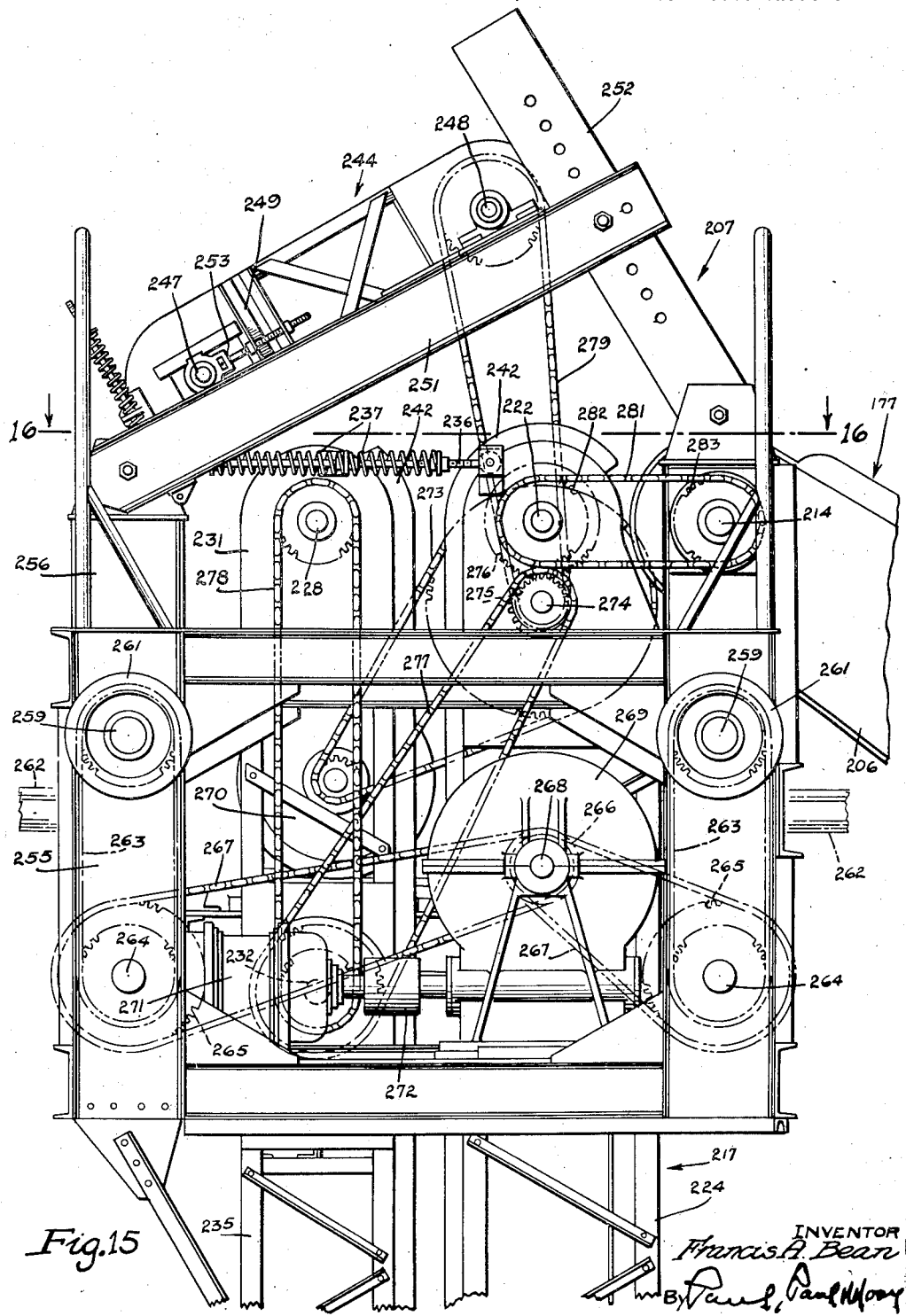
Figure 15 is a side elevation of the carriage for supporting the dock elevator, showing the means for driving the same.
Figure 16:
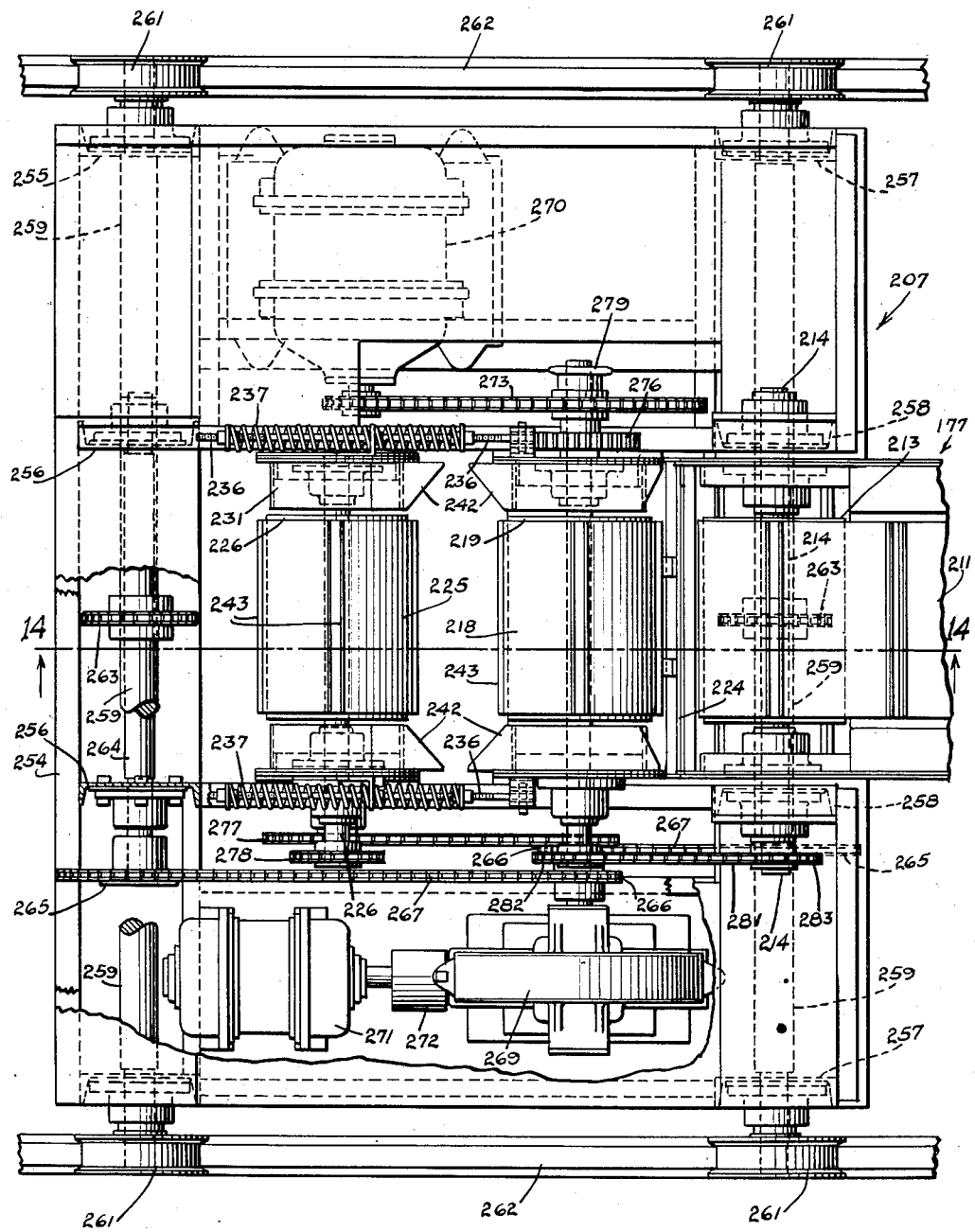
Figure 16 is a sectional plan on the line 16—16 of Figure 15, showing the rails for supporting the carriage of the dock elevator.

The carriage 207 comprises a suitable supporting frame 254 shown provided at one end with suitable channel uprights 255 and 256 and at its opposite end with similar channel uprights 257 and 258. Cross shafts 259 are shown provided upon the intermediate portion of the carriage 207 at each end thereof, and each is provided with flanged wheels 261 adapted to travel upon suitable rails 262 provided at the intermediate portion of the tower. As shown in Figure 14, the shafts 259 have chain drives 263 operatively connecting them with a pair of drive shafts 264, shown mounted below the shafts 259, in suitable bearings provided in the channel uprights 256 and 258 of the carriage frame. The drive shafts 264 have sprockets 265 secured thereto which are connected to a pair of sprockets 266 by chains 267, as best shown in Figures 15 and 16. The sprockets 266 are secured to the shaft 268 of a suitable speed reducer 269, shown operatively connected with a motor 271 by a suitable coupling 272. When the inclined conveyer 177 has been connected to the boom carriage 45, the clutch 125 is disconnected from the sprocket 129; and carriage 45, inclined conveyer 177, and tower carriage 207 with parts appending therefrom, may then be traversed at will and as a unit by the mechanism above described.

The conveyer belts of the dock conveyer 217 and the belt of the short inclined conveyer 244 are driven by a motor 270 shown mounted upon the frame of the carriage 207, and having a chain drive 273 connecting it with a counter shaft 274 which may be mounted in the carriage frame directly below the shaft 222 supporting the roller 219. A pinion 275 is secured to the shaft 274 and meshes with a gear 276 secured to the shaft 222. A chain drive 277 operatively connects the shaft 274 with the shaft 232 of the conveyer belt 225, as best shown in Figure 15, and a suitable chain drive 278 connects the shaft 232 with the upper shaft 228 of the elevator belt 225.

The shaft 248 of the short inclined conveyer 244 is shown driven by a chain 279 mounted upon suitable sprockets secured to the shafts 248 and 274, respectively. The inclined conveyer is shown driven by a chain 281 mounted upon suitable sprockets 282 and 283 secured respectively to the shafts 222 and 214, as best shown in Figure 15.

To convey the packages or bags from the lower end of the dock elevator 217 into the building, or from the building to said elevator, a suitable horizontally disposed conveyer 284 is provided at the lower end of the elevator. This conveyer is shown comprising an endless belt 285 supported in a suitable horizontally disposed structural frame 286. The belt 285 is supported at one end of the frame 286 by a roller 287, and at the opposite end of said frame by a roller 288. The roller 288 is shown mounted upon a shaft 289 supported in the frame 286. If desired, suitable means, such as indicated by the numeral 291, may be provided for relatively adjusting the pulley 288 to properly tension the belt 285.

The belt 285 is driven by a motor 292 supported upon the frame 286 and having a chain drive 293 connecting it with a counter shaft 294 which, in like manner, has a chain drive 295 connecting it with the shaft 296 of the roller 287. In order to guide the packages to and away from the elevator 217, the upper run of the belt 285, adjacent to the belt 218, passes over a pair of idler rollers 297 and 298, and a suitable inclined supporting plate 299. The rollers 297 and 298 are mounted in the lower end of the conveyer frame 224 and are movable therewith, and the side rails 320 of the plate 299 are shown pivoted at 304 to a pair of inclined side rails 300 secured to the lower end of the elevator frame 224 above the rollers 297 and 298. The belt 218 also passes over an idler pulley or roller 301 situated adjacent to the lower pulley 221 of the belt 218.

To further assist in guiding the packages or bags into and away from the lower end of the dock elevator, a roller 302 is pendently supported beneath the lower roller 227 of the belt 225 by suitable arms 106, similar to the corresponding arms shown in Figure 5. The roller 302 is driven from the shaft 229 by a chain drive 100, similar to the one shown in Figure 5. A plate 305 constitutes the upper portion of the horizontal conveyer frame 286. This plate slidably supports the free end of the pivoted plate 299, and also portions of the upper run of the belt 285.

It will thus be seen that the lower end of the conveyer frame 224 is not fixedly secured to the horizontal conveyer frame 286, but that it is relatively movable with respect thereto in a direction lengthwise thereof, to allow for the traveling movement of the carriage 207, supporting the elevator 217. The conveyer 284 may be supported on the frame of the tower truck, so as to move therewith when the tower is moved upon the dock in a direction parallel to the boat.

FIGURES 1, 29, 30, 31 AND 32

*Control mechanism*

Another important feature of this invention resides in the arrangement of the various electrical devices and controls employed for controlling the operations of the various elevators and conveyers which constitute the apparatus. These electrical devices and controls are so interconnected that a single operator stationed at the operator's station on the carriage 45, may conveniently view and control the operation of the entire apparatus. This novel control mechanism, as diagrammatically illustrated in Figures 29 and 30, comprises a plurality of manually operable switches mounted upon a suitable control panel 306 situated at the operator's station on the carriage 45. These switches are indicated by the numerals 307, 308, 309, 310, 311, 312, 313, 314, 315, and 316, and control the operations of the various motors of the apparatus.

The switch 308 controls the operation of a motor 317, mounted in the upper portion of the tower and which functions to raise and lower the boom 16 and the boat elevator carried thereby. This motor, as best shown in Figures 1 and 3, is operatively connected to a winding drum 318 by a train of gears 319, and a suitable cable 321 is coiled about the drum 318 and has one end engaged with a sheave 322, mounted in the upper portion of the tower and secured to a suitable clevis 323 connected to the upper end of a weight 324 which acts to counterbalance a portion of the weight of the boom 16 and the parts associated directly therewith. From the drum 318 the opposite end portion of the cable 321 passes over sheaves 325 and 326 and is connected to one end of a tension spring 327, the opposite end of which is connected to the lower end of the weight 324. By thus arranging the cable, when the drum 318 is rotated in one direction, one end portion of the cable will be winding onto the drum while the other end portion thereof will be paying out, or unwinding, thereby moving the weight 324 in one direction, and when the drum is rotated in the opposite direction, the weight will likewise move in the opposite direction.

One end of a cable 328 is secured to the clevis 323 and passes upwardly therefrom over a pair of sheaves 329 and 330 at the upper end of the tower, and thence downwardly, and is connected to the cross head 19 of the boom supporting frame 17, as shown in Figure 24. By thus supporting the frame 17, when the motor 317 is operated, the boom will be raised or lowered, depending upon the direction of rotation of the motor 317. The spring 327 compensates for any variation in the tension of the cable during operation of the motor 317.

The switch 308 is of the momentary contact type and is shown comprising two push buttons indicated by the letters U and D. This switch is of ordinary well-known construction, and controls the operation of the motor control switch 331, which also is of ordinary well-known construction, and is adapted to be actuated by a pair of solenoids 332 and 333 electrically connected with the switches 308 and 331. The motor 317 is shown connected to the supply circuit by the usual conductors 334, 335, and 336, and is of the usual reversible type. The switch 331, controlled by the operation of the switch 308, starts the motor in the desired direction of rotation, depending upon which button of the control switch 308 is depressed. The control buttons U and D of the switch 308 are normally in inoperative or circuit opening positions, and to start the motor, one of said buttons must be depressed and held in such depressed position as long as it is desired to have the motor operate in a certain direction. As soon as the operator removes his finger from the button, the supply of current to the motor is cut off, and the motor will automatically come to rest and thus interrupt the vertical traveling movement of the boom supporting frame 17. It will thus be noted that the boom may be retained at any desired position in its vertical travel. The control switch 308 is arranged as above described for the sake of safety, so that the operator cannot accidentally leave the motor running. The electrical connections of the switch 331 are well-known and it is therefore thought unnecessary to describe the same in detail.

Means is provided in connection with the boom supporting frame 17 for automatically interrupting the up-and-down movement of the boom supporting frame 17, when it reaches the limit of its travel in either direction, should the operator accidentally fail to remove his finger from the switch 308. Such means is diagrammatically illustrated in Figures 1 and 31, and comprises a plurality of limit switches 337, 338, and 339, preferably fixedly mounted in the frame of the tower, and each having a roller 341 adapted to be engaged by suitable means such as cams (not shown) provided upon the boom supporting frame 17. The uppermost limit switch 337 is in series with one side of the solenoid 332 so that current must flow therethrough to said solenoid, when the button U of the control switch 308 is depressed to raise the boom. When the means on the supporting frame engages the roller 341 of the limit switch 337, it will automatically open said limit switch, whereupon the solenoid 332 will become deenergized and permit the motor control switch 331 to return to its normal circuit-opening position, shown in Figure 31.

The limit switch 338 is positioned in advance of the switch 337 or, in the present instance, directly below it, and is normally in closed position, as indicated in the wiring diagram. This switch controls the supply of current to a solenoid 342 controlling the operation of a switch 343 which, when in open position, introduces a resistance 344 in the motor secondary circuit to thereby cause the motor to operate at a much slower speed. The switch 343 and resistance 344, diagrammatically illustrated in Figure 31, are well-known in the art and it is therefore thought unnecessary to herein describe the same in detail. When the carriage 17 engages the roller 341 of the limit switch 338, it will automatically open said switch, whereby the resistance 344 will automatically be introduced in the motor circuit so that the traveling speed of the frame 17 in its upward movement will be considerably reduced, before the frame 17 engages the limit switch 337, which completely interrupts the movement of the carriage.

The limit switch 339 at the lower portion of the tower is normally in closed position, and is in series with one side of the solenoid 333 so that the current must flow therethrough in order to maintain said solenoid energized so that the motor 317 may be operated to lower the boom. This switch is also positioned to be engaged by the frame 17 and is opened thereby when the frame reaches the limit of its downward movement, whereupon the supply of current to the solenoid 333 is cut off which permits the motor control switch 331 to return to its normal inoperative position.

In order to render the apparatus safe in operation, particularly when lowering the toe elevator 43, into the hull of a boat, a suitable warning signal is provided at the operator's station for indicating when the toe conveyer 83 and elevator 43 engage an obstruction upon the deck of a boat, or in the hull thereof. Such means is diagrammatically illustrated in Figure 31, and may comprise a suitable weight-actuated switch 345 comprising a contact member normally bridging the gap between a pair of contacts 340 and 350, provided in one of the wires leading to the limit switch 339. This limit switch 345 is normally electrically engaged with the contacts 340 and 350, as shown in Figure 31, and has a portion 346 depending below the bottom of the lower end of the boat elevator 43 and toe conveyer 83, as best shown in Figure 4, adapted to be engaged by an object, such for example, as the bottom of the boat or the deck, or articles stored in the boat, when the elevator 43 is being lowered. In Figure 31, the switch 345 is shown in its normal closed position so that when the down button D of the control switch 308 is depressed, the current will flow therethrough to the solenoid 343.

A pair of contacts 347 and 348 are shown provided in the wire 349, and a suitable warning device 351, such as a bell, connected in series with the wire 349. The wire 349 is suitably connected to the supply circuit. When the switch 345 is actuated to open the gap between the contacts 340 and 350, the supply of current to the solenoid 333 will be cut off and the motor 317 will stop. At substantially the same time, the contact member 330 will bridge the gap between the contacts 347 and 348, whereupon the warning device 351 will operate and apprise the operator that the elevator 43 has reached the limit of its downward movement, or that it has encountered an obstruction in its path. The warning signal 351 has been found useful because it warns the operator when, through tidal action or otherwise, the boat or its contents rise under the elevator. No limit switch is needed under the toe conveyer, because the latter is articulated and folds up when meeting an obstruction.

The switch 309 on the panel 306 controls the operation of the motor 121 which also is of the reversible type, and functions to translate the carriage 45 upon the track 117, and also to rotate the boat elevator 43 to swing the outer end of the toe conveyer 80. The control switch 309, like the control switch 308, is shown comprising two buttons, indicated by the letters I and O, which also are of the momentary contact type, so that one of said buttons must be held in depressed position to cause the motor to operate and move the carriage. When the I button is depressed, the carriage will travel forwardly into the tower, and when the O button is depressed, it will move outwardly towards the end of the boom.

The switch 309 also provides means for controlling the swinging movement of the toe conveyer. Such movement of the toe conveyer is effected when the clutch control lever 126 is swung to the left from its neutral position, shown in Figure 11, whereupon the clutch member 125 will engage the clutch member 128 and thereby cause the drum 142 to rotate in one direction or the other, depending upon which button of the control switch 309 has been depressed. When the clutch lever 126 is moved to the right, from the position shown in Figure 11, the clutch member 125 thereof will operatively engage the clutch member 127 which drives the shaft 115, so that when the motor 121 is operated, said shaft will be rotated to translate the carriage 45 upon the boom. It will thus be seen that the single switch 309 controls both the traveling movement of the carriage upon the boom, and also the swinging movement of the toe conveyer 80.

The control switch 310 is of substantially the same construction as the switch 309, and controls the operation of the motor 271 which operates the carriage 207.

The control switch 311 on the panel is of the three-button type, and comprises three buttons marked F, R, and S. This switch controls the operation of the short inclined deflector conveyer 178 provided at the upper end of the boat elevator. When the F button is depressed, the conveyer 178 will continue to operate in one direction until the operator depresses one of the other buttons. When the R button is depressed, the traveling movement of the conveyer belt 179 of the conveyer 178 will be in the opposite direction, and when the S button is depressed, the conveyer will stop, regardless of which way it is operating at the time.

The control switch 312 is electrically associated with the motor 95 which controls the operation of the toe conveyer, and this switch is similar to the switch 311, and provides means whereby the operator may cause the conveyer belt 79 of the toe conveyer to travel in either direction, as may be desired, or he may interrupt its movement by depressing the button S.

The control switch 313 controls the operation of the motor 71 which drives the belts 46 and 49 of the boat elevator 43, whereby these belts may be operated to raise or lower packages in the elevator, and also whereby both belts may be interrupted when necessary.

The switch 314 is directly connected with the motor 272 which drives the inclined elevator 177 and the dock elevator 217, and like the switches 312 and 313, provides means whereby the operation of the belt 211 of the conveyer 177 may be operated in either direction, and also whereby its movement may be interrupted when desired.

The control switch 315 controls the operation of the motor 292 which drives the horizontal dock conveyer 284.

The switches 309 and 310 are similar to the switch 308, and control the operation of the main motor switches 352 for the motors 121 and 271. The motor switches 352 and 331 are of the magnetically operated type, as clearly illustrated in Figures 31 and 32. These switches being of well-known construction, as heretofore stated, it is thought unnecessary to describe the same in detail herein. The switches 311 to 315, inclusive, are substantially alike in construction and it is therefore thought unnecessary to show but two such switches in the drawings.

In Figure 30, two such switches are shown, indicated generally by the numerals 353 and 354. For the sake of illustration, the switch 353 is shown electrically connected with the motor 95 controlling the operation of the toe conveyer 80, and the switch 354 is shown electrically connected with the motor 71 controlling the operation of the belts of the boat elevator 43. The switches 353 and 354 are shown electrically connected with the conductors 355, 356, and 357 of the motors, and control the flow of current thereto. The switches 353 and 354 each comprise a pair of solenoids 358 and 359 adapted to actuate the contacts of said switches, and whereby each motor is provided with an independent control whereby the operation of the mechanisms associated with said motors may be operated independently of one another, depending upon the manipulation of the push buttons of the control switches 312 and 313.

To facilitate the operation of the control switches, all of the three-button switches 311 to 315 are electrically interconnected with the master control switch 307, so that by the simple manipulation of the push buttons of the master control switch, all of the various mechanisms controlled by the switches 311 to 315, inclusive, may be automatically set into motion and in the proper direction, depending upon the manipulation of the push buttons of said master control switch.

To thus simultaneously operate the switches controlling the operation of the motors 194, 95, 71, 272, and 292, a pair of circuit closers 361 and 362 are connected with the main motor switches 353 and 354 of said motors, and also with the master control switch 307. The circuit closers 361 and 362 are normally in circuit-opening positions, as shown in Figure 30, and are adapted to be selectively moved into circuit-closing positions by suitable solenoids 363 and 364, operatively associated therewith; these solenoids each have one end connected to a wire 365, to which the solenoids 358 and 359 of the switches 353 and 354 are also connected.

The solenoid 363 has a wire 366 connecting it with a contact 367 of the master control switch 307, and this contact 367 and a supplemental contact 368 is adapted to be bridged by a movable contact member 369 of the push button F of the master control switch 307. The movable contact 369 normally bridges the gap between a pair of contacts 371 and 372. A wire 373 connects one end of the solenoid 364 with a contact 374 of the master switch 307, and this contact and a supplemental contact 375 are adapted to be electrically engaged by a movable contact member 376 of the push button R of the master switch. The movable contact 376 normally bridges the gap between a pair of contacts 377 and 378 and this latter contact is electrically connected with the contact 372 by a wire 379. In like manner, the contact 368 is connected with the contact 377 by a wire 381. The push button S of the master control switch carries a contact member 382 which normally bridges the gap between a pair of contacts 383 and 384, and the contact 384 is electrically connected with the contact 378 by a wire 385.

A current-supply wire 386 connects the contact 383 with the supply circuit as shown, and a wire 387 connects the contact 384 of the master control switch with one of the contacts of each individual control switch 311 to 315, inclusive, as clearly illustrated in Figure 30.

The circuit closer 362 is shown provided with a plurality of contacts having wires 388 and 389 connecting them with wires 391 and 392 leading to the solenoids 359. Other wires connect the remaining contacts of the circuit closer 362 with the solenoids 359 of the corresponding control switches of the motors 194, 272 and 292, not shown in Figure 30.

Certain of the contacts of the circuit closer 361 have wires 393 and 394 connecting them with wires 395 and 396 of the solenoids 358, as will readily be noted by reference to Figure 30. The wires 395 and 396 connect the solenoids 358 with their respective control switches 312 and 313. Each circuit closer is shown provided with two rows of contacts and the two adjacent rows of contacts of said switches, as arranged in Figure 30, are electrically connected together by wires 397, and each group of said contacts are electrically connected by a wire 398. A wire 399 is shown connecting the adjacent contacts of the circuit closers 361 and 362 with one of the conductors of the supply circuit.

The solenoids 358 and 359 have wires 401 electrically connecting them with the wire 365, and the wire 365 is electrically connected to a wire 402 which is connected to one side of a circuit breaker 403, the other side of which has a wire 404 connecting it to the main line conductor 356 of the control switch 353. When the circuit breaker 403 is in circuit closing position, as shown in Figure 30, current will be supplied from the main line wire 356 to one end of each solenoid 358 and 359. The motor control switch 354 of the motor 71 is also provided with a circuit breaker 403 which is interposed in the wire 365, as will be noted by reference to Figure 30. The control switches 354 of the motor switches 194, 272, and 292 are provided with similar circuit breakers 403, all of which are interposed in the wire 365.

The motor switches 75, 194, 272, and 292 are shown provided with the usual circuit breakers 403 adapted to be actuated by suitable heating coils 406 to automatically open the motor circuits, in the event that any of said motors accidentally become overloaded. Thus, should one of the elevators become blocked, the motor driving said elevator or conveyer will automatically stop, whereupon the entire conveying system will be temporarily interrupted, because of the various control devices being interconnected as hereinbefore stated. When any one of the circuit breakers 403 is actuated to open its circuit, all of the motors are interrupted, because of the supply of current to the solenoids 358 and 359 becoming temporarily deenergized, and thereby allowing the control switches 353 and 354 to return to their normal circuit-opening positions. Before any of the above mentioned motors may be again started, the operator will depress the button of the reset switch 316, whereupon the gap between the contacts 416 and 417 of said switch will be closed so that current is supplied to the solenoids 407, which results in the resetting of the circuit-breakers 403.

The operator may then, by manipulating the control switch of the motor of the particular elevator or conveyer which has become jammed, cause said elevator or conveyer to operate independently of the rest of the apparatus, whereby the bags or packages which may have accumulated thereon may be freed so that the entire system may again be rendered operative. When the congested portion of the apparatus or system has thus been rendered operative, the entire apparatus may again be put into operation by manipulation of the push buttons of the master control switch 307.

In order to simplify and expedite the operation and resetting of the circuit breakers 403, when one of said circuit breakers has been actuated to open its circuit as a result of an overload, these circuit breakers are each provided with a solenoid 407 having terminals 408 and 409 as shown in Figure 30. The terminals 408 of each solenoid are connected together by wires 411 and 412, which wires are connected by a wire 413 to the supply circuit. The terminals 409 of the solenoids 407 have wires 414 connecting them to a wire 415 having one end connected to the contact 416 of the reset switch 316. The complemental contact 417 of the reset switch is spaced from the contact 416 and has a wire 418 connecting it to the contact 383 of the master control switch 307. The contact member 419 of the reset switch is normally in the position shown in Figure 30, in which position the current supply to the solenoids 407 is cut off. When the reset switch 316 is actuated to cause the contact member 419 to bridge the gap between the contacts 416 and 417, the solenoids 407 will be energized, as hereinbefore stated, causing the armatures thereof to restore the circuit breakers 403 in their normal operative positions, in the event that any of the circuit breakers are in circuit-opening position.

The specific construction of the various control switches 353 and 354, the master control switch 307, and the individual control switches 311 to 315, as well as the specific construction of the circuit closers 363 and 364, is old and well-known in the art, and it is therefore thought unnecessary to herein describe these parts in detail.

FIGURES 10, 11, 30 TO 32

Operation

In the operation of this novel package handling apparatus, when the boom is in the dotted line position C, indicated in Figure 1, the carriage 45 will be moved outwardly upon the boom from the dotted line position E to that shown at G in Figure 1. This is accomplished by depressing the push button O of the control switch 309 which causes the motor 121 to operate, it being understood that the operator has first shifted the control lever to the right when viewed as shown in Figure 11. When the carriage 45 has been moved outwardly to the desired position, the inclined conveyer 177 is lowered through the cable 422, drum 423, and motor 424, so that the bearing boxes 209 (Figure 9) rest on the carriage 45, after which the hooks 216 are fastened by the bolts 220. The lever 126 is then moved to the left to disengage the wheels of the carriage 45 from the motor 121, after which the operator will depress the button D on the control switch 308 on the panel, whereupon the motor 317 will operate to lower the boom supporting frame 17 from the dotted line position C to the full line position in Figure 1, or to any intermediate position. After the conveyer 177 has thus been connected to the carriage 45, the tower carriage 207, conveyer 177, and boom carriage 45 may readily be moved as a unit by the simple manipulation of the control switch 310 of the motor 271, the carriage 45 being propelled by the carriage 207 as a result of being connected thereto by the inclined conveyer 177.

When the toe conveyer 80 has been properly positioned with respect to the bags or packages to be conveyed from the boat to the receiving means on the dock, the operator will depress the button F on the master control switch 307, whereupon all of the conveyers will operate so that packages placed upon the toe conveyer 80 will be conveyed to the elevator 43, and will be elevated upwardly between the adjacent runs of the belts 46 and 49 thereof, as diagrammatically illustrated in Figure 27. The inclined conveyer belt 87 which is driven by the motor 95, directs the bags upwardly between the adjacent runs of the two belts, and the roller 104, which is driven from the shaft 105, cooperates with the belt 87 to guide the packages upwardly between the two belts, whereby the bags will be conveyed upwardly by said belts for delivery to the inclined conveyer 177 provided at the upper end of the elevator.

An important feature of the invention, as hereinbefore stated, resides in the provision of resilient elements 61 which constantly urge the inner run of the belt 49 into frictional engagement with the packages so that the frictional engagement of the belts with the bags or packages will cause the belts to elevate them without slippage. At the upper end of the elevator 43, the packages will engage the short inclined conveyer section 178 which, by reason of being power driven, cooperates with the driven rollers 204 and 199 to feed the bags from the elevator onto the receiving end of the conveyer 177. This conveyer 177 conveys the bags upwardly to the upper end of the dock elevator 217, where they engage the short inclined conveyer 244 which guides them into the space between the adjacent runs of the belts 225 and 218 of the dock elevator. These latter belts being driven by the motor 272, will convey the bags downwardly onto the horizontal conveyer 284 upon the dock. From the horizontal conveyer 284, the bags or packages are delivered onto a suitable receiving means, not shown in the drawings.

It will thus be seen that the entire conveying system, when operating under normal conditions, may be controlled by the single master control switch 307. When the button S of this switch is depressed, the entire system is interrupted, and will remain so until either the F or the R button thereof is actuated, whereupon the rollers will rotate in either one direction or the other, depending upon which button is depressed. It is also to be noted that the individual control switches for the various motors may be operated independently of each other. The switches 308, 309, and 310, as hereinbefore stated, are of the momentary contact type, so that the operator must keep his finger upon one or the other of said buttons to cause the motor associated therewith to function.

As hereinbefore stated, the control switch 309, in addition to translating the carriage upon the boom, when the latter is disconnected from the carriage 207, also controls the swinging movement of the toe conveyer, so that the operator may conveniently swing said conveyer to the desired point within the hull or upon the deck of the boat to facilitate loading the packages thereon. It is also to be noted that when the clutch operating lever 126 is in its neutral position, as shown in Figure 11, the toe conveyer may readily be swung about its axis by a workman grasping a hold thereof and either pushing or pulling it around from one place to another.

When loading a boat, the traveling movement of all of the conveyers of the apparatus are, of course, reversed so that the packages will be conveyed from the warehouse or dock to the dock elevator 217, whereby they are elevated to the upper end of the conveyer 177, which conveys them to the upper end of the boat elevator 43. The boat elevator then conveys them to the toe conveyer, from whence the packages may readily be removed for storage in the boat. When the boat has been loaded or unloaded, as the case may be, and the apparatus is no longer to be used, the operator will depress the button U on the control switch 308, whereupon the motor 317 will operate to elevate the boom supporting frame 17 and the carriage 45 supported upon said boom. When the boom has reached substantially the elevation indicated at C in Figure 1, the limit switch 337 will automatically stop the elevating of the boom. The operator or an attendant will then remove the hooks 216 which secure the bearings of the inclined conveyer shaft 208 in position upon the carriage 45. A suitable hook 421 which is suspended from a cable 422 coiled about a winding drum 423, is then attached to the inclined conveyer 177, after which the winding drum is actuated by a suitable motor 424, to swing the inclined conveyer 177 to dotted line position F, indicated within the tower. Before swinging the inclined conveyer upwardly to its inoperatve position, as above described, the dock elevator carriage 207 is moved from the full to the dotted line position, indicated in Figure 1, so that the conveyer 177 may be supported in substantially a vertical position within the tower.

When the inclined conveyer has thus been folded to its inoperative position, the carriage 45 may be moved inwardly upon the boom 16 and onto the fixed tracks 119 provided in the intermediate portion of the tower, as hereinbefore described. It is to be understood that before the carriage 45 is moved into the tower, the rails 118 on the boom are horizontally alined with the rails 119 within the tower, as shown in Figure 23, so that the wheels of the carriage may travel over the joints between said rails. When the carriage 45 has been moved to the dotted line position E within the tower, shown in Figure 1, the boom 16 may be folded upwardly to the dotted line position B by operation of the motor 37, carried upon the cross head 19 of the boom supporting frame. The toe conveyer 80 at the lower end of the boat elevator 43 may also be swung upwardly against the elevator to the dotted line position indicated at D so that it will not project beyond the confines of the tower, when the apparatus is in inoperative position.

When the carriages and conveyers have thus been moved to their inoperative positions within the tower, boats may pass by the tower without interference therewith, as it will be noted that neither the tower nor any of the parts carried thereby will overhang the dock. This is necessary to comply with the rules of harbor navigation.

FIGURES 33 TO 37

Modified form

Figures 33 to 37, inclusive, illustrate a conveying system or bag handling apparatus of simplified form comprising a boat elevator 425 pivoted at 426 to an inclined boom 427, which is pivotally mounted upon a truck frame 428 adapted to travel upon suitable rails 429 secured to the dock 431.

Figure 33:
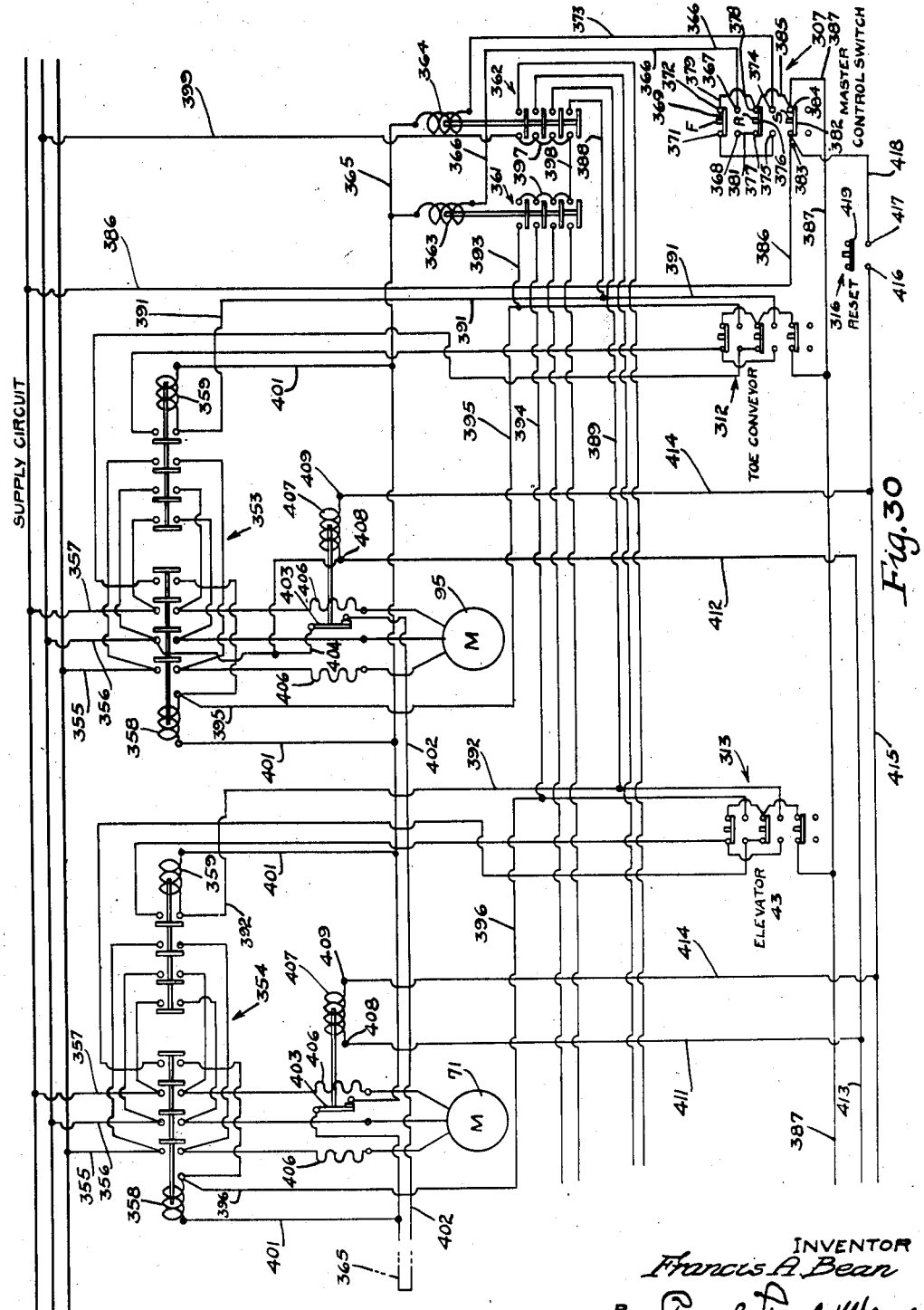
Figure 33 is a view showing a modified construction wherein the tower has been eliminated.
Figure 34:
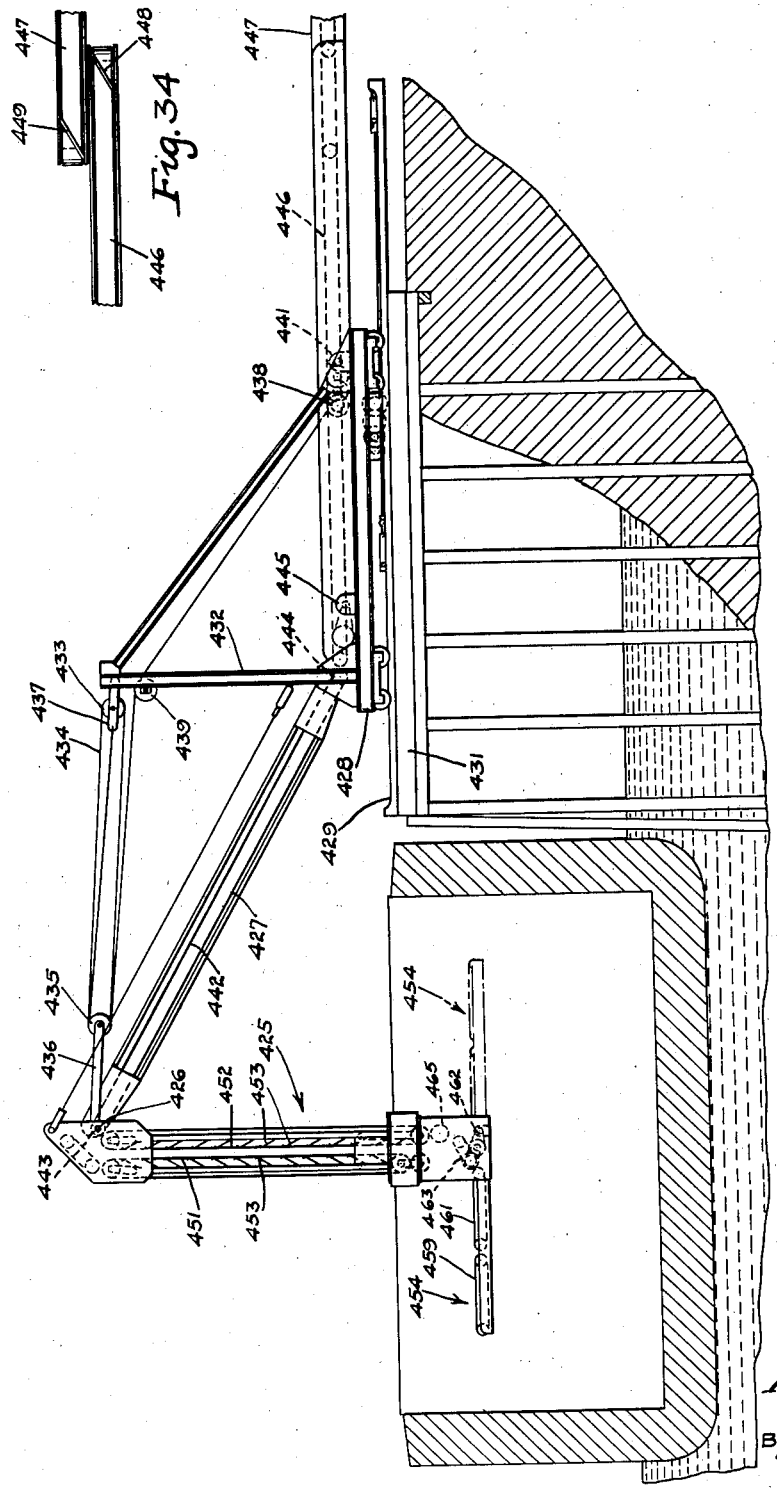
Figure 34 is a plan view of a portion of the dock conveyer shown in Figure 33.
Figure 35:
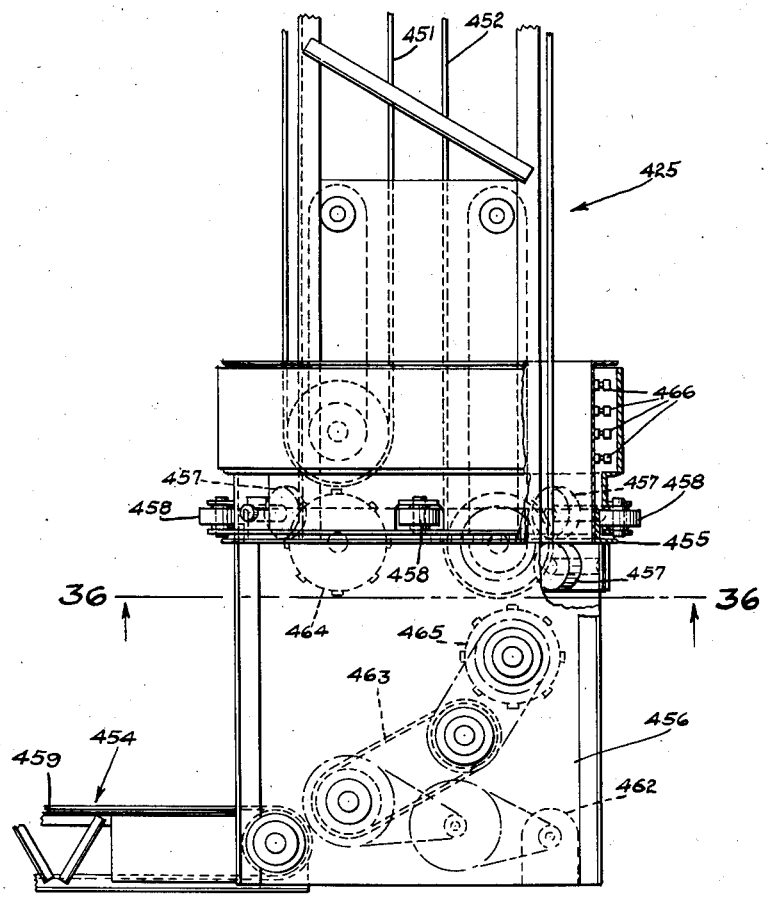
Figure 35 is an enlarged detail view of the lower end of the boat elevator shown in Figure 33.
Figure 36:
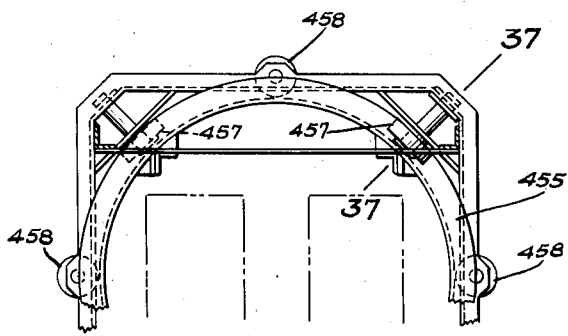
Figure 36 is a sectional plan view on the line 36—36 of Figure 35, showing only a portion of the apparatus; and, Figure 37 is a detail sectional view on the line 37—37 of Figure 36.
Figure 37:
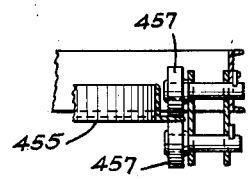

A mast 432 is secured upon the truck frame 428 and has a pulley 433 secured to its upper end having a cable 434 connecting it with a sheave 435 attached to the upper end of the boom by a suitable bail 436. One end of the cable 434 is secured to the frame 437 of the sheave 433, and the opposite end of the cable has an operative connection with a winding mechanism 438 mounted at the opposite end of the truck. The cable 434 has a running connection with a sheave 439 provided at the upper end of the mast 432. A suitable motor 441, indicated in dotted lines in Figure 33, provides means for operating the winding mechanism 438.

The boom 427 has a conveyer belt 442 supported thereon by suitable pulleys 443 and 444 and this belt may be driven by a suitable motor 445 mounted upon the truck frame 428. A horizontal conveyer 446 is supported upon the truck frame 428 and comprises a suitable conveyer belt which may be driven from the motor 445. An extension conveyer 447 leads from the conveyer 446 to a point within a building or to some other destination, and is so arranged in connection with the conveyer 446 that packages delivered from the boat onto the conveyer 446 will be guided onto the extension conveyer 447 by a suitable deflector 448. A similar deflector 449 is shown provided at one end of the extension conveyer 447 to guide the articles from the extension conveyer 447 onto the conveyer 446, as when the apparatus is being used for loading a boat. See Figure 34.

In the construction here shown, the boat conveyer 425 comprises a pair of suitable conveyer belts 451 and 452 having their adjacent runs spaced apart to provide a passageway for packages. The adjacent runs of the belts 451 and 452 are constantly urged inwardly by a plurality of resilient elements 453 provided in the frame of the elevator. A suitable toe conveyer 454 is provided at the lower end of the elevator 425, and is adapted for relative rotation with respect thereto by means of a circular track 455, secured to the lower end of the elevator 425. The toe conveyer 454 is shown having a box-like frame 456 which carries a plurality of load carrying rollers 457 and guide rollers 458 which travel upon the track 455 and permit the toe conveyer 454 to swing about the axis of the circular track 455, as will be noted by the full and dotted lines in Figure 33.

The toe conveyer 454 is shown comprising suitable conveyer belts 459 and 461, operatively connected together and adapted to be driven by a motor 462 mounted in the frame 456 of the toe conveyer. An inclined conveyer belt 463 is provided within the box-like structure 456 to guide the packages from the toe conveyer into the elevator and from the elevator onto the toe conveyer. This inclined conveyer cooperates with a roller 464 to thus guide the packages in their travel to and from the elevator 425. A similar roller 465 is shown provided within the frame 456, and the two rollers 464 and 465 are preferably mounted for swinging movement so that they may adapt themselves to the packages being fed through the apparatus.

Because of the swinging connection between the box-like frame 456 and the lower end of the frame of the elevator 425, a plurality of suitable collector rings 466 are shown secured to the circular track at the lower end of the elevator 425, and these collector rings are adapted to be electrically engaged by a plurality of suitable brushes not shown, having connections with the motor 462. The collector rings 466 are connected with a source of current supply in the usual manner. By thus constructing the lower portion of the elevator 425, the toe conveyer 454 may be manually rotated about the axis of the circular frame 455 without interfering with the electrical connections for the motor 462.

I claim as my invention:

1. In a conveying system, a portable support, a substantially vertically disposed elevator adjustably mounted on said support and adapted to receive and convey bags from one elevation to another, a conveyer at the lower end of said elevator, power driven means for guiding the bags from the conveyer into the elevator, drives for said elevator and said conveyer, and means whereby said conveyer may be rotated about a vertical axis, said support providing the sole support for said elevator.

2. In a conveying system, a portable support, an elevator movably mounted on said support and adapted to convey bags or packages from one elevation to another, a conveyer at the lower end of said elevator adapted to feed packages thereto, independent drives for said elevator and said conveyer, means whereby said conveyer may be rotated about a vertical axis, said support providing the sole support for said elevator, and a power driven roller and an inclined belt for guiding the bags from the conveyer into the elevator.

3. In a conveying system for loading or unloading boats, an elevator, a horizontal conveyer connected to the lower end of said elevator and supported thereby, means whereby the elevator and conveyer may be rotated as a unit about a vertical axis, means independent of the boat for supporting said elevator and whereby the latter may be moved into or out of a boat without having a supporting connection therewith, and a power driven roller and an inclined conveyer section for guiding the bags from the conveyer into the elevator.

4. In a conveying system for loading or unloading boats, a vertical elevator comprising complemental belts, a conveyer at the lower end of said elevator, a power driven, pendently supported roller for guiding the packages from the conveyer into the elevator, means for driving the elevator and conveyer, means whereby the conveyer may be rotated about a vertical axis within the boat, and a movable support for the elevator, independent of the boat, and whereby the elevator may be lowered into or removed from a boat without having a supporting connection therewith.

5. In a conveying system, an elevator comprising a pair of belts having their adjacent runs spaced apart to receive and convey packages therebetween, a conveyer connected with the lower end of said elevator and comprising a belt adapted to feed packages towards or away from the elevator, means for guiding packages from the conveyer into the space between the elevator belts, means for driving said conveyer, and means whereby said conveyer may be rotated about a vertical axis.

6. In a conveying system, an elevator comprising a plurality of belts spaced apart to receive and convey packages therebetween, a sectional supporting member engaging the back side of a run of one of said belts, and comprising a plurality of movably connected together sections, resilient elements constantly urging said supporting member into engagement with said belt to cause the latter to frictionally engage packages delivered thereto, and means for guiding packages into or out of the lower end of said elevator.

7. In a conveying system, an elevator comprising a plurality of belts spaced apart to receive and convey packages therebetween, a sectional supporting member engaging the back side of a run of one of said belts, resilient elements constantly urging said supporting member into engagement with said belt to cause the latter to frictionally engage packages delivered thereto, a toe conveyer connected with the lower end of said elevator, means whereby said toe conveyer may be rotated about a vertical axis, and power driven means for guiding packages from the conveyer into the elevator, or from the elevator onto the conveyer, depending upon the direction of movement of the elevator.

8. In a conveying system, an elevator comprising a suitable frame having a pair of conveyer belts mounted therein, the adjacent runs of which are spaced apart to receive and convey packages from one elevation to another, flexible means forming a backing for one of said belt runs, a plurality of resilient elements engaged with said flexible belt-supporting means and constantly urging the belt run associated therewith in a direction towards the other of said belts, means for driving said belts, and a conveyer connected with the lower end of the elevator.

9. In a conveying system, an elevator comprising a suitable frame having a pair of conveyer belts mounted therein, the adjacent runs of which are spaced apart to receive and convey bags or packages from one elevation to another, means for selectively operating said belts in either direction whereby the elevator may be operated to raise or lower the bags, means providing a backing for one of said belt runs, comprising a plurality of semi-rigid sections operatively connected together, spring elements engaged with said semi-rigid sections and constantly urging the belt run associated therewith in a direction towards the other of said belts, means for driving said belts, a conveyer connected with the lower end of the elevator, and means whereby said conveyer may be rotated about a vertical axis.

10. In a conveying system, an elevator comprising a suitable frame having a pair of conveyer belts mounted therein, the adjacent runs of which are spaced apart to receive and convey packages, a support for one of said belt runs comprising a plurality of hinged-together sections, spring elements secured in said frame and having their free ends bearing against said sections to hold them against said belt runs and thereby cause said runs to frictionally engage packages delivered to the elevator, and means for driving said belts.

11. In a conveying system, an elevator comprising a suitable frame having a pair of conveyer belts mounted therein, the adjacent runs of which are spaced apart to receive and convey packages, a support for one of said belt runs comprising a plurality of hinged-together sections, spring elements secured in said frame and having their free ends bearing against said sections to hold them against said belt runs and thereby cause said runs to frictionally engage packages delivered to the elevator, means for driving said belts, and driven means connected with the lower end of the elevator for guiding packages into the space between said belts.

12. In a conveying system, an elevator comprising a vertical frame having pulleys at its upper and lower portions, conveyer belts supported on said pulleys and having their adjacent runs spaced apart to receive and convey packages, a pivoted frame supporting one of said pulleys at the lower end of the elevator frame whereby the lower portion of one of said belts is adapted for swinging movement to facilitate feeding packages into the elevator between said belts, and a power driven roller pendently supported from said pivoted frame and operating to guide the bags into the lower end of the elevator between said belts.

13. In a conveying system, an elevator comprising a vertical frame having pulleys at the upper and lower portions thereof, conveyer belts supported on said pulleys and having their adjacent runs spaced apart to receive and convey packages, a pivoted frame supporting one of said pulleys at the lower end of the elevator frame whereby the lower portion of one of said belts is adapted for swinging movement to facilitate feeding packages into the elevator between said belts, a conveyer conected with the lower end of the elevator adapted to convey packages thereto, and power driven means interposed between the lower end of one of said elevator belts and said conveyer for guiding the packages from the toe conveyer into the elevator.

14. In a conveying system, an elevator comprising a substantially vertical frame having pulleys at the upper and lower portions thereof, conveyer belts supported on said pulleys and having their adjacent runs spaced apart to receive and convey packages, a pivoted frame supporting one of said pulleys at the lower end of the elevator frame whereby the lower portion of one of said belts is adapted for swinging movement, tension means constantly urging said swingable belt section in a direction towards the other of said belts to facilitate feeding packages into the elevator between the adjacent runs of said belts, a horizontally disposed conveyer connected to the lower end of said elevator frame, and a power driven roller at the lower end of the elevator for guiding bags from the conveyer into the elevator.

15. In a conveying system, an elevator adapted to convey bags or packages from one elevation to another and in either direction, a conveyer at the lower end of said elevator for feeding packages thereto, said conveyer being adapted to be folded upwardly against the elevator when not in use, a conveyer connected with the upper end of the elevator adapted to receive packages therefrom, and deflecting means at the upper portion of the elevator for guiding the packages from the elevator onto said upper conveyer, comprising a plurality of power driven rollers.

16. In a conveying system, an elevator adapted to convey bags or packages from one elevation to another, a conveyer connected to the lower end of said elevator for feeding packages thereto, said conveyer being adapted for complete rotary movement about a vertical axis, a conveyer connected with the upper end of the elevator adapted to receive packages therefrom, and deflecting means at the upper and lower ends of the elevator for guiding the packages into or away from the elevator, comprising a plurality of power driven rollers and an inclined belt.

17. In a conveying system, a supporting structure, a boom mounted for vertical movement upon said structure, a carriage movably mounted upon the boom, an elevator secured to the carriage and depending therefrom, a second elevator mounted for traveling movement in said supporting structure, and a conveyer connecting the upper ends of said elevators whereby packages may be conveyed from one to the other, and whereby said elevators and conveyer may be moved as a unit.

18. In a conveying system, a supporting structure, a boom mounted for vertical and swinging movements upon said structure, a carriage movably mounted upon the boom, an elevator secured to the carriage and depending therefrom, a second elevator mounted for traveling movement in said supporting structure, a conveyer connecting the upper ends of said elevators whereby packages may be conveyed from one to the other, said conveyer permitting said elevators to be vertically moved relatively to each other, and suitable drives for said elevators.

19. In a conveying system, a supporting structure, a boom mounted for vertical movement upon said structure, a carriage movably mounted upon the boom, an elevator secured to the carriage and depending therefrom, a toe conveyer connected with the lower end of the elevator, means whereby said toe conveyer may be rotated about a vertical axis, a second elevator in the supporting structure, a conveyer connecting the upper ends of said elevators whereby packages may be conveyed from one to the other, means at the lower end of the second elevator for receiving packages therefrom, and said elevators and conveyers having independent drives.

20. In a conveying system for loading filled bags into a boat or unloading them therefrom, an elevator comprising cooperating belts between which the bags are conveyed, a plurality of conveyers provided with independent drives, an operator's station, independent control devices for said elevator and said conveyers situated at the operator's station, a master control at the operator's station, and means interconnecting said independent control devices with the master control, whereby said elevator and conveyers may be operated either independently of one another, or simultaneously, to selectively operate the apparatus for either loading or unloading.

21. In a conveying system for loading filled bags into a boat or unloading them therefrom, an elevator comprising cooperating belts between which the bags are conveyed, a plurality of conveyers provided with independent drives, an operator's station, control devices for said elevator and said conveyers situated at the operator's station, a movable support for the elevator, means for translating said elevator support in a horizontal direction, a control device for said translating means situated at the operator's station, and a master control interconnected with all of said elevator and conveyer control devices whereby the various mechanisms of the apparatus may be operated either independently of one another, or simultaneously, to selectively operate the apparatus for either loading or unloading.

22. In a conveying system for loading filled bags into a boat or unloading them therefrom, an elevator comprising cooperating belts between which the bags are conveyed, a plurality of conveyers provided with independent drives, an operator's station, control devices for said elevator and said conveyers situated at the operator's station, a movable support for the elevator comprising means for bodily raising or lowering said elevator, means for translating said elevator support in a horizontal direction, a control device for said translating means also at the operator's station, and a master control interconnected with all of said elevator and conveyer control devices whereby the various mechanisms of the apparatus may be operated either independently of one another, or simultaneously, to selectively convey bags in either direction.

23. In a conveying apparatus for loading filled bags into a boat or unloading them therefrom, a supporting structure having an elevator supported thereby, a toe conveyer connected with the lower end of said elevator and adapted for rotary movement about a vertical axis, an inclined conveyer connected with the upper end of the elevator, independent drive motors for said elevator and said conveyers, an operator's station, an independent control switch for each motor located at the operator's station, and a master control switch interconnected with said independent motor control switches, said independent and master control switches providing means whereby all of said motors may be operated either independently of one another, or simultaneously, to convey filled bags either to or from a boat.

24. In a conveying apparatus for loading filled bags into a boat or unloading them therefrom, a supporting structure comprising a boom, an elevator supported on said boom and depending therefrom and having an independent drive motor, a second motor for actuating said boom to raise or lower the elevator, a toe conveyer connected with the lower end of the elevator, a third motor for driving said toe conveyer, an independent control switch for each motor whereby said motors may be operated independently of one another, and a master control switch interconnected with said independent control switches whereby the operation of all of said conveyer motors may be controlled simultaneously to selectively operate the apparatus for either loading or unloading.

25. In a conveying apparatus, a movable supporting structure comprising a boom, an elevator supported on said boom and depending therefrom and having an independent drive motor, a second motor for actuating said boom to raise or lower the elevator, a toe conveyer connected with the lower end of the elevator, a third motor for driving said toe conveyer, an independent control switch for each motor whereby said motors may be operated independently of one another, a master control switch interconnected with said independent control switches whereby the operation of all of said conveyer motors may be controlled simultaneously and independently of said independent control switches, and means for automatically interrupting said second motor when the elevator reaches the limit of its movement in either direction.

26. In a conveying apparatus, a movable supporting structure, a boom mounted thereon, an elevator supported on said boom and depending therefrom and having an independent drive motor, a second motor for actuating said boom to raise or lower the elevator, a toe conveyer connected with the lower end of the elevator, a third motor for driving said toe conveyer, an independent control switch for each motor whereby said motors may be operated independently of one another, a master control switch interconnected with said independent control switches whereby all of said conveyer motors may be operated simultaneously and independently of said independent control switches, and a limit switch at the lower end of the elevator connected in the circuit of said second motor and positioned to be engaged by an obstruction, upon downward movement of the elevator, to thereby automatically interrupt the operation of said second motor.

27. In a conveying apparatus, a movable supporting structure comprising a boom, an elevator supported on said boom and depending therefrom and having an independent drive motor, a second motor for actuating said boom to raise or lower the elevator, a toe conveyer connected with the lower end of the elevator, a third motor for driving said toe conveyer, an independent control switch for each motor whereby said motors may be operated independently of one another, a master control switch interconnected with said independent control switches whereby all of said motors may be operated simultaneously and independently of said independent control switches, a limit switch at the lower end of the elevator connected in the circuit of said second motor and positioned to be engaged by an obstruction, upon downward movement of the elevator, to thereby automatically interrupt the operation of said second motor, and a signalling device associated with said limit switch and adapted to function, when said limit switch is actuated by contact with an object.

28. In a conveying system, an elevator for vertically conveying the bags, an inclined, power driven conveyer section at the bottom of the elevator, and a power driven roller disposed over said conveyer section and cooperating therewith to feed the bags into the elevator.

29. In a conveying system, an elevator comprising cooperating belts for vertically conveying the bags, an inclined, power driven conveyer section at the bottom of the elevator, and a power driven roller disposed over said conveyer section and adapted for relative swinging movement and cooperating with said conveyer section to feed bags into the elevator between the belts thereof.

30. In a conveying system, an elevator comprising cooperating belts for vertically conveying the bags, a conveyer connected to the lower end of the elevator for delivering bags thereto, and means at the lower end of the elevator for feeding the bags thereinto, said means comprising an inclined, power driven conveyer section, and a power driven roller disposed over said conveyer section and cooperating therewith to positively feed the bags between the belts of the elevator.

31. In a conveying system, an elevator comprising power driven, spaced members cooperating to vertically convey the bags, a conveyer at the lower end of the elevator for delivering bags to the elevator, a relatively short inclined conveyer section between the elevator and said conveyer, means for driving said conveyer section, a power driven roller pendently supported over said conveyer section and cooperating therewith to positively feed the bags into the elevator, a conveyer connected to the upper end of the elevator, and power driven means for guiding the bags from the elevator onto said upper conveyer.

32. In a conveying system, an elevator comprising spaced belt runs cooperating to vertically convey the bags, a conveyer at the lower end of the elevator for delivering bags to the elevator, a relatively short inclined conveyer section between the elevator and said conveyer, means for driving said conveyer section independently of the elevator, a roller pendently supported over said conveyer section and cooperating therewith to positively feed the bags into the elevator, said roller having an operative connection with one of said belt runs, a conveyer connected to the upper end of the elevator, and power driven means for guiding the bags from the upper end of the elevator onto said upper conveyer.

33. In a conveying system, a pair of vertically disposed elevators, each comprising spaced belts for conveying the bags, means at the bottoms of said elevators for feeding bags into or out of said elevators, each of said feeding means comprising an inclined conveyer section and a pendently supported power driven roller, said rollers cooperating with said inclined conveyer sections to feed the bags into or out of the elevators, an upper conveyer interposed between the upper ends of said elevators and adapted to convey bags therebetween, and a power driven, inclined conveyer section at the upper end of each elevator for guiding the bags into or out of said elevators, said upper inclined conveyer sections being mounted for swinging movement to adapt them for different sizes of bags, and means whereby the elevators may be vertically translated independently of one another, and without disrupting the operative connections between said elevators and the conveying means connected thereto.

34. In a conveying system, a pair of vertically disposed elevators, each comprising spaced belts for conveying the bags, means at the bottoms of said elevators for feeding bags into or out of said elevators, each of said feeding means comprising an inclined conveyer section and a pendently supported power driven roller, said rollers cooperating with said inclined conveyer sections to feed the bags into or out of the elevators, an upper conveyer interposed between the upper ends of said elevators and adapted to convey bags therebetween, and a power driven, inclined conveyer section at the upper end of each elevator for guiding the bags into and out of said elevators, said upper inclined conveyer sections being mounted for swinging movement to adapt them for different sizes of bags, and a control station comprising a plurality of controls operatively associated with the various operating mechanisms of the apparatus, whereby the operation of the entire conveying system may be controlled from said station.

FRANCIS A. BEAN.